(12) United States Patent
Qiao et al.

(10) Patent No.: US 11,860,066 B2
(45) Date of Patent: Jan. 2, 2024

(54) DYNAMIC STRAIN FIELD MEASURING METHOD AND SYSTEM FOR ROTOR BLADE BASED ON BLADE TIP TIMING

(71) Applicant: XI'AN JIAOTONG UNIVERSITY, Shaanxi (CN)

(72) Inventors: Baijie Qiao, Shaanxi (CN); Xuefeng Chen, Shaanxi (CN); Chunyan Ao, Shaanxi (CN); Weifeng He, Shaanxi (CN); Laihao Yang, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 153 days.

(21) Appl. No.: 17/325,208

(22) Filed: May 20, 2021

(65) Prior Publication Data
US 2021/0278312 A1    Sep. 9, 2021

Related U.S. Application Data

(63) Continuation of application No. PCT/CN2020/080638, filed on Mar. 23, 2020.

(30) Foreign Application Priority Data

Mar. 22, 2019 (CN) .......................... 201910226897.2

(51) Int. Cl.
*G01M 7/02* (2006.01)
*F01D 5/14* (2006.01)
*G01B 21/32* (2006.01)

(52) U.S. Cl.
CPC ............... *G01M 7/025* (2013.01); *F01D 5/14* (2013.01); *G01B 21/32* (2013.01); *F05D 2240/307* (2013.01); *F05D 2260/81* (2013.01)

(58) Field of Classification Search
None
See application file for complete search history.

(56) References Cited

U.S. PATENT DOCUMENTS 7,574,338 B1    8/2009    Kaul

FOREIGN PATENT DOCUMENTS

| CN | 101625260 A | * | 1/2010 |
| CN | 105352586 A |   | 2/2016 |

(Continued)

OTHER PUBLICATIONS

Prof. Paolo Emilio Lino Maria Pennacchi, Development of an optimal sensor placement algorithm and modal analysis of a turbine blade by means of OBR optical-ber strain sensor, 2015-2016, Politecnico Di Milano Facolta' Di Ingegneria Industriale , (Year: 2015).*

(Continued)

*Primary Examiner* — Matthew G Marini
(74) *Attorney, Agent, or Firm* — Dragon Sun Law Firm, PC; Nathaniel Perkins

(57) ABSTRACT

The present invention discloses a dynamic strain field measuring method and system for a rotor blade based on blade tip timing. The method includes the following steps: establishing a three-dimensional finite element model of a to-be-measured rotor blade, and extracting modal parameters of the three-dimensional finite element model; determining the number and circumferential mounting positions of blade tip timing sensors; establishing a mapping relationship between single-point displacement and full-field dynamic strains of the blade; acquiring blade tip single-point displacement of the rotor blade based on the blade tip timing sensors; and realizing, by the single-point displacement, dynamic strain measurement in any position and direction of the rotor blade based on the mapping relationship.

15 Claims, 15 Drawing Sheets

(56) References Cited

FOREIGN PATENT DOCUMENTS

| | | |
|---|---|---|
| CN | 107103111 A | 8/2017 |
| CN | 110608710 A | 12/2019 |

OTHER PUBLICATIONS

International Search Report of PCT/CN2020/080638.
Written Opinion of PCT/CN2020/080638.
Li, Gang. Non-official translation: Research on Non-Contract Measurement Method of Blade Dynamic Stress based on Blade Tip Timing. China Master's Theses Full-Text Database, Engineering Science & Technology II, No. 11. Nov. 15, 2017 (Nov. 15, 2017). ISSN: 1674-0246. pp. 29-44.
Chen, Shuai. Research on Dynamic Strain Measurement Method Using Dynamic Displacement Information. China Master's Theses Full-Text Database, Engineering Science & Technology II, No. 1. Jan. 15, 2019 (Jan. 15, 2019). SSN: 1674-0246. pp. 13-26.

\* cited by examiner

DYNAMIC STRAIN FIELD MEASURING METHOD AND SYSTEM FOR ROTOR BLADE BASED ON BLADE TIP TIMING

CROSS-REFERENCE TO RELATED APPLICATIONS

The present application is filed based on and claims priorities to a Chinese patent application No. CN2019102268972 filed on Mar. 22, 2019 and PCT/CN2020/080638 filed on Mar. 23, 2020, which are incorporated herein by reference in its entirety.

TECHNICAL FIELD

The present invention belongs to the technical field of non-contact vibration tests of rotor blades of rotating machinery and in particular relates to a dynamic strain field measuring method and system for a rotor blade based on blade tip timing.

BACKGROUND

The integrity of a high-speed rotor blade directly affects the safe operation of an overall structure of an aircraft engine, and due to the affects of factors such as harsh working environments and strong alternating loads, vibration fatigue cracks are extremely prone to being generated in a service process of the high-speed rotating blade to result in serious accidents. A main failure mode of the blade of the aircraft engine is high-cycle fatigue resulted from over-high blade vibration. The high-cycle fatigue of the blade is mainly caused by dynamic stress resulted from various aerodynamic loads and mechanical loads, massive cycles may be accumulated within a short time to generate the fatigue cracks, and particularly, the fatigue failure of the blade is extremely prone to being caused by the dynamic stress when resonance of the blade happens. In research and production processes of the aircraft engine, the vibration of the blade is required to be measured in order to master the vibration characteristics of the blade. For a long time, dynamic strain measurement of the blade of the aircraft engine is realized in a way of pasting strain gauges to the surface of the rotor blade, by which dynamic strains of finite positions of finite blades can only be measured, the reliability is relatively poor, the continuous working time is relatively short, and particularly, only few strain gauges can acquire effective information even if a great number of the strain gauges are arranged on the turbine blade in a high-temperature environment, and therefore, the survival rate of the strain gauges is very low. Due to the characteristics of high-speed rotation of the blade of the aircraft engine, non-contact measurement based on blade tip timing becomes the development direction of researches in the field of blade vibration tests.

The above-mentioned information disclosed in the background is merely intended to help understand the background part of the present invention, and therefore, the information may contain information not constructing the prior art well known by the ordinary skilled in the art at home.

SUMMARY

With specific to problems existing in the prior art, the present invention provides a dynamic strain field measuring method and system for a rotor blade based on blade tip timing, so that the problem that a current dynamic strain reconstruction method for a blade is only suitable for dynamic strain estimation under single-modal vibration is solved, and the measuring method and system have the advantage of simultaneously reconstructing dynamic strains of all nodes on the surface of and inside the rotor blade.

Sensing blade tip vibration information by virtue of a sensor mounted close to the inner side of a casing is called "blade tip timing (BTT)". A current blade tip timing technology is concerned by aircraft engine manufacturing and testing magnates, for example, the American Air Force's Arnold Engineering Development Center (AEDC) has brought out a non-intrusive stress measurement system (NSMS) for a blade. After decades of development, non-contact measurement based on blade tip timing becomes the most promising replacing method for contact strain measurement, vibration information such as vibration frequencies, amplitude values, excitation orders and resonance regions of all blades may be measured by blade tip timing, and furthermore, estimation of dynamic strains on specific positions of the blade under specific modal vibration may be realized by virtue of a finite element model. Dynamic strain inversion based on non-contact measurement is a key to decide whether the blade tip timing can replace a traditional strain gauge technology or not. The working environment of the rotor blade is harsh, vibration of the blade under complex load excitation is resulted from multimodal superposition, at the moment, the position of the maximum dynamic stress point is unfixed, and no fixed conversion relationships exist between displacement and the strains; and the current dynamic strain reconstruction method is only suitable for estimating the dynamic strain of the blade under single-modal vibration, but cannot realize reconstruction of a dynamic strain field under multimodal vibration at any moment. Therefore, the overall strain field of the rotor blade is reconstructed by blade tip single-point vibration inversion.

The purpose of the present invention is realized by adopting the following technical solution, the dynamic strain field measuring method for the rotor blade based on blade tip timing includes the following steps:
  in the first step, establishing a three-dimensional finite element model of the to-be-measured rotor blade, and extracting modal parameters of the three-dimensional finite element model;
  in the second step, determining the number and circumferential mounting positions of blade tip timing sensors;
  in the third step, establishing the mapping relationship between single-point displacement and full-field dynamic strains of the blade;
  in the fourth step, acquiring blade tip single-point displacement of the rotor blade based on the blade tip timing sensors; and
  in the fifth step, realizing, by the single-point displacement, dynamic strain measurement in any position and direction of the rotor blade based on the mapping relationship.

In the first step of the method, first $n_m$ order modal parameters: a modal frequency $f_i$, a displacement modal shape $\phi_i$ with the size being $n_{dof} \times 1$ and a strain modal shape $\psi_i$ with the size being $2n_{dof} \times 1$, of the three-dimensional finite element model are extracted by modal analysis, and a full-field strain modal shape matrix, $\psi=[\psi_1,\psi_2,\ldots,\psi_{n_m}]$ with the size being $2n_{dof} \times n_m$, of the rotor blade is constructed, wherein $n_m$ represents for a modal number, i represents for a modal order, $n_{dof}$ represents for the number of degrees of freedom of the finite element model of the rotor blade, $n_{dof}=3 n_n$, and $n_n$ represents for the number of nodes of the finite element model of the rotor blade.

In the first step of the method, strains of each node of the finite element model of the rotor blade include six strain components in total, including three positive strains $\varepsilon_x$, $\varepsilon_y$, $\varepsilon_z$ and three shearing strains $\gamma_{xy}$, $\gamma_{yz}$, $\gamma_{xz}$.

In the second step of the method, a relationship between the number $n_{b11}$ of the blade tip timing sensors mounted in a circumferential direction of a rotor blade casing and the multimodal number $n_m$ of vibration is that: $n_{b11} \leq 2n_m + 1$.

In the second step of the method, a measuring point selection matrix $S_{btt}$ arranged in the circumferential direction of the blade tip timing sensor casing under multimodal excitation is constructed:

$$S_{btt} = \begin{bmatrix} 1 & \sin(EO_1\theta_1) & \cos(EO_1\theta_1) & \ldots & \sin(EO_{n_m}\theta_1) & \cos(EO_{n_m}\theta_1) \\ 1 & \sin(EO_1\theta_2) & \cos(EO_1\theta_2) & \ldots & \sin(EO_{n_m}\theta_2) & \cos(EO_{n_m}\theta_2) \\ \vdots & \vdots & \vdots & \vdots & \vdots & \vdots \\ 1 & \sin(EO_1\theta_{n_{btt}}) & \cos(EO_1\theta_{n_{btt}}) & \ldots & \sin(EO_{n_m}\theta_{n_{btt}}) & \cos(EO_{n_m}\theta_{n_{btt}}) \end{bmatrix}$$

wherein the size of the measuring point selection matrix $S_{btt}$ is $n_{btt} \times (2n_m+1)$, $\theta_j$ represents for layout angles of the blade tip timing sensors $j(j=1, \ldots n_{btt})$ in the casing, represents for the total number of the $j$ $(j=1, \ldots n_{btt})^{th}$ blade tip timing sensors arranged in the circumferential direction, and $EO_i$ represents for a concerned excitation order $(i=1, \ldots n_m)$; a position where a rotating speed sensor is located serves as a reference 0°, a limited mounting angle range of the casing is removed, and $n_{btt}$ bit angles are randomly selected in the circumferential direction of the casing to serve as mounting positions of the blade tip timing sensors; and the condition number $\kappa$ of the blade tip timing measuring point selection matrix $S_{btt}$ is calculated, a random process is repeated for R times, and the measuring point layout when the condition number $\kappa$ of the matrix is minimum is selected therefrom.

In the third step of the method, a conversion matrix, $$T = \left[ \frac{\psi_1}{\phi_{btt,1}}, \frac{\psi_2}{\phi_{btt,2}}, \ldots, \frac{\psi_i}{\phi_{btt,i}}, \ldots, \frac{\psi_{n_m}}{\phi_{btt,n_m}} \right]$$

with the size being $2n_{dof} \times n_d$, of the single-point displacement and the full-field dynamic strains of the blade is constructed, wherein $\phi_{btt,i}$ represents for an $i^{th}$ order displacement modal shape of a blade tip timing measuring point of the blade.

In the fourth step of the method, blade tip multimodal vibration signals $u_{btt}(t)$ on the $N^{th}$ turn of the rotor blade are acquired by the $n_{btt}$ blade tip timing sensor, and furthermore, an $n_m$ order vibration parameter $\beta=(S_{btt})^\dagger u_{btt}(t)$ is acquired by utilizing a circumferential Fourier fitting algorithm, $\beta=[c,A_1\cos(\varphi_1),A_1\sin(\varphi_1),\ldots,A_{n_m}\cos(\varphi_{n_m}),A_{n_m}\sin(\varphi_{n_m})]^T$, $A_i$ wherein represents for a vibration amplitude, $f_i$ represents for a modal frequency, and $\varphi_i$ represents for an initial phase † the superscript represents for the inversion of the matrix; the superscript T represents for the transposition of a vector; and further, blade tip single-point multimodal vibration signals are acquired by reconstruction:

$$u_{btt}(t) = c + \sum_{i=1}^{n_m} u_{btt,i}(t) =$$

$$c + \sum_{i=1}^{n_m} A_i \sin(\omega_i t + \varphi_i) = c + \sum_{i=1}^{n_m} A_i \cos(\varphi_i)\sin(\omega_i t) + A_i \sin(\varphi_i)\cos(\omega_i t)$$

wherein $u_{btt,i}(t)$ represents for decoupled $i^{th}$ order vibration signals, c represents for static deformation of the blade, $\omega_i$ represents for a circular frequency of the multimodal vibration of the blade, and t represents for a vibration moment of the blade.

In the fifth step of the method, strains of all the nodes on the surface of and inside the blade at each turn of the rotor blade are calculated according to a formula $S(t)=T[u_{btt,1}, u_{btt,2}, \ldots, u_{btt,i}, \ldots, u_{btt,n_m}]^T$ to obtain $S(t)=[\varepsilon_{1,x},\varepsilon_{1,y},\varepsilon_{1,z}, \gamma_{1,xy},\gamma_{1,yz},\gamma_{1,xz}, \ldots, \varepsilon_{i,x},\varepsilon_{i,y},\varepsilon_{i,z},\gamma_{i,xy},\gamma_{i,yz},\gamma_{i,xz}, \ldots, \varepsilon_{n_m,x},\varepsilon_{n_m,y}, \varepsilon_{n_m,z},\gamma_{n_m,xy},\gamma_{n_m,yz},\gamma_{n_m,xz}]^T$, and the strains $S(t)$ include the positive strains and the shearing strains, wherein $\varepsilon_{i,x}$ represents for the positive strain of the $i^{th}$ node of the finite element model of the blade in an x direction, $\varepsilon_{i,y}$ represents for the positive strain of the $i^{th}$ node of the finite element model of the blade in a y direction, $\varepsilon_{i,z}$ represents for the positive strain of the $i^{th}$ node of the finite element model of the blade in a z direction, $\gamma_{i,xy}$ represents for the shearing strain of the $i^{th}$ node of the finite element model of the blade in an x-y direction, $\gamma_{i,yz}$ represents for the shearing strain of the $i^{th}$ node of the finite element model of the blade in a y-z direction, $\gamma_{i,xz}$ represents for the shearing strain of the $i^{th}$ node of the finite element model of the blade in an x-z direction, and the superscript T represents for the transposition of a vector.

On the other hand of the present invention, a measuring system for implementing the method includes:
  a plurality of blade tip timing sensors arranged on a rotor blade casing;
  a blade tip timing vibration measuring module connected with the blade tip timing sensors so as to measure circumferential blade tip multimodal vibration signals of a rotor blade; and
  a calculation unit connected with the blade tip timing vibration measuring module, and the calculation unit including:
  a modal analysis module configured to perform modal analysis based on a three-dimensional finite element model of a to-be-measured rotor blade so as to acquire a displacement modal shape $\phi_i$ of first $n_m$ order modal frequency $f_i$ of the rotor blade and construct a full-field strain modal matrix $\psi=[\psi_1,\psi_2,\ldots,\psi_{n_m}]$ of the rotor blade;
  a measuring point optimization module configured to optimize the number of measuring points of the blade tip timing sensors arranged on the rotor blade, wherein a measuring point selection matrix $S_{btt}$ arranged in the circumferential direction of the blade tip timing sensor casing under multimodal excitation is constructed, a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;

a conversion matrix calculation module configured to construct a conversion matrix of single-point displacement and full-field dynamic strains of the blade; and a strain field reconstruction module configured to calculate positive strains and shearing strains of all nodes on the surface of and inside the blade at each turn of the rotor blade.

In the measuring system, the blade tip timing vibration measuring module includes the rotating speed sensor, a signal conditioning module and a time-displacement conversion module, wherein the rotating speed sensor is configured to measure the rotating speed of the blade; the time-displacement conversion module is configured to acquire blade tip vibration displacement of the blade based on a speed signal; and the signal conditioning module is configured to extract a vibration frequency and amplitude value parameters of the blade from the vibration displacement.

Beneficial Effects:

According to the dynamic strain field measuring method for the rotor blade based on blade tip timing, provided by the present invention, the measurement of the overall dynamic strain field of the rotor blade under multimodal vibration can be realized by only virtue of single-point vibration of the blade. Not only can the measurement of the dynamic strain on the surface of the blade under the multimodal vibration be realized, but also the measurement of the positive strains and the shearing strains of the nodes inside the blade can be realized. The limitation that a traditional dynamic strain inversion method based on blade tip timing can only be used for approximately reconstructing the dynamic strain of a certain point of the blade under single-modal vibration is broken. The method provided by the invention is capable of realizing multimodal vibration decoupling, measurement precision is high, the calculation process is simple, online measurement is easy, a great number of strain gauges can be saved, and a reconstruction system for the dynamic strain field of the rotor blade is simple in process and easy to realize.

BRIEF DESCRIPTION OF THE DRAWINGS

By reading the detailed description in the preferred specific implementation manners hereunder, various other advantages and benefits of the present invention will become clear for the ordinary skilled in the art. Accompanying drawings of the specification are merely intended to show the preferred implementation manners, rather than to limit the present invention. Obviously, the accompanying drawings described below are only some embodiments of the present invention, and other accompanying drawings can also be acquired by the ordinary skilled in the art based on the accompanying drawings without creative labor. Moreover, the same components are marked by the same symbols in the overall accompanying drawings.

In the accompanying drawings:

FIG. 2(a) to FIG. 2(b) are schematic structural diagrams of a dynamic strain field measuring system for the rotor blade based on blade tip timing, provided by the present invention, wherein FIG. 2(a) shows a composition of a dynamic strain field reconstruction system for the rotor blade; and FIG. 2(b) shows a circumferential mounting schematic diagram of a blade tip timing vibration measuring module and blade tip timing sensors;

FIG. 4(a) to FIG. 4(f) are a displacement modal shape and a strain modal shape of the rotor blade in one embodiment, wherein FIG. 4(a) is a first flexural displacement shape; FIG. 4(b) is a first flexural strain shape; FIG. 4(c) is a first torsional displacement shape; FIG. 4(d) is a first torsional strain shape; FIG. 4(e) is a second flexural displacement shape; and FIG. 4(f) is a second flexural strain shape;

FIG. 7(a) to FIG. 7(b) are comparison results of the dynamic strain of a No. 748 node on a blade body in a reconstructed strain field of the rotor blade in one embodiment and a true dynamic strain, wherein FIG. 7(a) is a comparison result of three positive strain components and the true dynamic strain; and FIG. 7(b) is a comparison result of three shearing strain components and the true dynamic strain;

FIG. 8(a) to FIG. 8(b) are comparison results of the dynamic strain of a No. 1100 node on a blade root in a reconstructed strain field of the rotor blade in one embodiment and the true dynamic strain, wherein FIG. 8(a) is a comparison result of three positive strain components and the true dynamic strain; and FIG. 8(b) is a comparison result of three shearing strain components and the true dynamic strain.

The present invention is further explained below in combination with the accompanying drawings and embodiments.

DETAILED DESCRIPTION

The specific embodiments of the present invention will be described in more detail below by reference to accompanying drawings 1-8(b). Although the specific embodiments of the present invention are shown in the accompanying drawings, it should be understood that the present invention can be implemented in various forms, but should not be limited by the embodiments described herein. On the contrary, these embodiments are provided in order to more thoroughly understand the present invention and integrally deliver the scope of the present invention to the skilled in the art.

It should be noted that some words are used in the specification and claims to denote specific components. It should be understood by the skilled in the art that a technician may call the same component with different nouns. The functional difference of the component, rather than the difference of the nouns, is used as a distinction criterion in the specification and claims. For example, "including" or "includes" mentioned in the overall specification and claims is generally an open word so as to be explained as "including, but not being limited to". The subsequent description of the specification is a preferred implementation manner of the present invention, however, the description is intended to conform to a general principle of the specification, rather than to limit the scope of the present invention. The protective scope of the present invention should be based on the scope defined by the appended claims.

In order to facilitate understanding the embodiments of the present invention, the specific embodiments serving as examples are further explained below in combination with the accompanying drawings, and each accompanying drawing is not regarded as a limit to the embodiments of the present invention.

Figure 1:
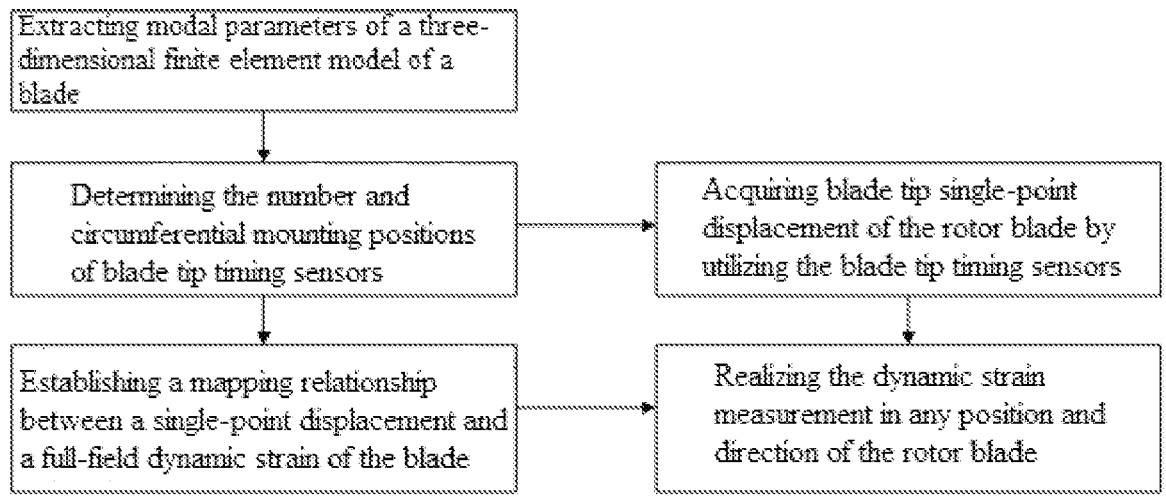
FIG. 1 is a schematic process diagram of a preferred example of a dynamic strain field measuring method for a rotor blade based on blade tip timing, provided by the present invention.

In order to realize better understanding, FIG. 1 is a working process diagram of a dynamic strain field measuring method for a rotor blade based on blade tip timing, as shown in FIG. 1, the dynamic strain field measuring method for the rotor blade based on blade tip timing includes the following steps:

in the first step S1, a three-dimensional finite element model of the to-be-measured rotor blade is established, and modal parameters of the three-dimensional finite element model are extracted;

in the second step S2, the number and circumferential mounting positions of blade tip timing sensors are determined;

in the third step S3, a mapping relationship between single-point displacement and full-field dynamic strains of the blade is established;

in the fourth step S4, blade tip single-point displacement of the rotor blade is acquired based on the blade tip timing sensors; and in the fifth step S5, dynamic strain measurement in any position and direction of the rotor blade is realized by the single-point displacement based on the mapping relationship.

In one implementation manner of the method, in the first step S1, first $n_m$ order modal parameters: the modal frequency $f_i$, a displacement modal shape $\phi_i$ with the size being $n_{dof} \times 1$ and a strain modal shape $\psi_i$ with the size being $2n_{dof} \times 1$, of the three-dimensional finite element model are extracted by modal analysis, and a full-field strain modal shape matrix, $\psi = [\psi_1, \psi_2, \ldots, \psi_{n_m}]$ with the size being $2n_{dof} \times n_m$, of the rotor blade is constructed, wherein $n_m$ represents for the modal number, i represents for the modal order, $n_{dof}$ represents for the number of degrees of freedom of the finite element model of the rotor blade, $n_{dof} = 3n_n$, and $n_n$ represents for the number of nodes of the finite element model of the rotor blade.

In one implementation manner of the method, in the first step S1, strains of each nodes of the finite element model of the rotor blade include six strain components in total, including three positive strains $\varepsilon_x$, $\varepsilon_y$, $\varepsilon_z$ and three shearing strains $\gamma_{xy}$, $\gamma_{yz}$, $\gamma_{xz}$.

In one implementation manner of the method, in the second step S2, a relationship between the number $n_{btt}$ of the blade tip timing sensors mounted in the circumferential direction of a rotor blade casing and the multimodal number $n_m$ of vibration is that: $n_{btt} \leq 2n_m + 1$.

In one implementation manner of the method, in the second step S2, a measuring point selection matrix $S_{btt}$ arranged in the circumferential direction of a blade tip timing sensor casing under multimodal excitation is constructed:

$$S_{btt} = \begin{bmatrix} 1 & \sin(EO_1\theta_1) & \cos(EO_1\theta_1) & \ldots & \sin(EO_{n_m}\theta_1) & \cos(EO_{n_m}\theta_1) \\ 1 & \sin(EO_1\theta_2) & \cos(EO_1\theta_2) & \ldots & \sin(EO_{n_m}\theta_2) & \cos(EO_{n_m}\theta_2) \\ \vdots & \vdots & \vdots & \vdots & \vdots & \vdots \\ 1 & \sin(EO_1\theta_{n_{btt}}) & \cos(EO_1\theta_{n_{btt}}) & \ldots & \sin(EO_{n_m}\theta_{n_{btt}}) & \cos(EO_{n_m}\theta_{n_{btt}}) \end{bmatrix}$$

wherein the size of the measuring point selection matrix $S_{btt}$ is $n_{btt} \times (2n_m+1)$, $EO_i$ represents for the concerned excitation order; the position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and the measuring point layout when the condition number κ of the matrix is minimum is selected therefrom.

In one implementation manner of the method, in the third step S3, a conversion matrix, $$T = \left[ \frac{\psi_1}{\phi_{btt,1}}, \frac{\psi_2}{\psi_{btt,2}}, \ldots, \frac{\psi_i}{\phi_{btt,i}}, \ldots, \frac{\psi_{n_m}}{\phi_{btt,n_m}} \right]$$

with the size being $2n_{dof} \times n_d$, of the single-point displacement and the full-field dynamic strains of the blade is constructed, wherein $\phi_{btt,i}$ represents for an $i^{th}$ order displacement modal shape of a blade tip timing measuring point.

In one implementation manner of the method, in the fourth step S4, blade tip multimodal vibration signals $u_{btt}(t)$ on the $N^{th}$ turn of the rotor blade is acquired by the $n_{btt}$ blade tip timing sensors, and furthermore, an $n_m$ order vibration parameter is acquired by utilizing a circumferential Fourier fitting algorithm, wherein $\beta = [c, A_1 \cos(\varphi_1), A_1 \sin(\varphi_1), \ldots, A_{n_m} \cos(\varphi_{n_m}), A_{n_m} \sin(\varphi_{n_m})]^T$, $A_i$ represents for a vibration amplitude, $f_i$ represents for a modal frequency, and $\varphi_i$ represents for an initial phase; the superscript † represents for the inversion of the matrix; the superscript T represents for the transposition of a vector; and further, blade tip single-point multimodal vibration signals is acquired by reconstruction:

$$u_{btt}(t) = c + \sum_{i=1}^{n} u_{btt,i}(t) =$$
$$c + \sum_{i=1}^{n} A_i \sin(\omega_i t + \varphi_i) = c + \sum_{i=1}^{n} A_i \cos(\varphi_i) \sin(\omega_i t) + A_i \sin(\varphi_i) \cos(\omega_i t)$$

wherein $u_{btt,i}(t)$ represents for the decoupled $i^{th}$ order vibration signals, c represents for static deformation of the blade, $\omega_i$ represents for a circular frequency of the multimodal vibration of the blade, and t represents for a vibration moment of the blade.

In one implementation manner of the method, in the fifth step S5, the strains of all the nodes on the surface of and inside the blade at each turn of the rotor blade are calculated according to a formula $S(t)=T[u_{btt,1}, u_{btt,2}, \ldots, u_{btt,i}, \ldots, u_{btt,n_m}]^T$, to obtain $S(t)=[\varepsilon_{1,x},\varepsilon_{1,y},\varepsilon_{1,z},\gamma_{1,xy},\gamma_{1,yz},\gamma_{1,xz}, \ldots ,\varepsilon_{i,x}, \varepsilon_{i,y},\varepsilon_{i,z},\gamma_{i,xy},\gamma_{i,yz},\gamma_{i,xz}, \ldots ,\varepsilon_{n_m,x},\varepsilon_{n_m,y},\varepsilon_{n_m,z},\gamma_{n_m,xy},\gamma_{n_m,yz},\gamma_{n_m,xz}]^T$, and the strains $S(t)$ include the positive strains and the shearing strains, wherein $\varepsilon_{i,x}$ represents for the positive strain of the $i^{th}$ node of the finite element model of the blade in an x direction, $\varepsilon_{i,y}$ represents for the positive strain of the $i^{th}$ node of the finite element model of the blade in a y direction, $\varepsilon_{i,z}$ represents for the positive strain of the $i^{th}$ node of the finite element model of the blade in a z direction, $\gamma_{i,xy}$ represents for the shearing strain of the $i^{th}$ node of the finite element model of the blade in an x-y direction, $\gamma_{i,yz}$ represents for the shearing strain of the $i^{th}$ node of the finite element model of the blade in a y-z direction, $\gamma_{i,xz}$ represents for the shearing strain of the $i^{th}$ node of the finite element model of the blade in an x-z direction, and the superscript T represents for the transposition of a vector.

In order to further understand the present invention, the present invention is further described below in combination with the accompanying drawings 1-8 and the specific embodiments, and it should be emphasized that the following description is merely exemplary, while application objects of the present invention are not limited to the following examples.

Figure 2A:
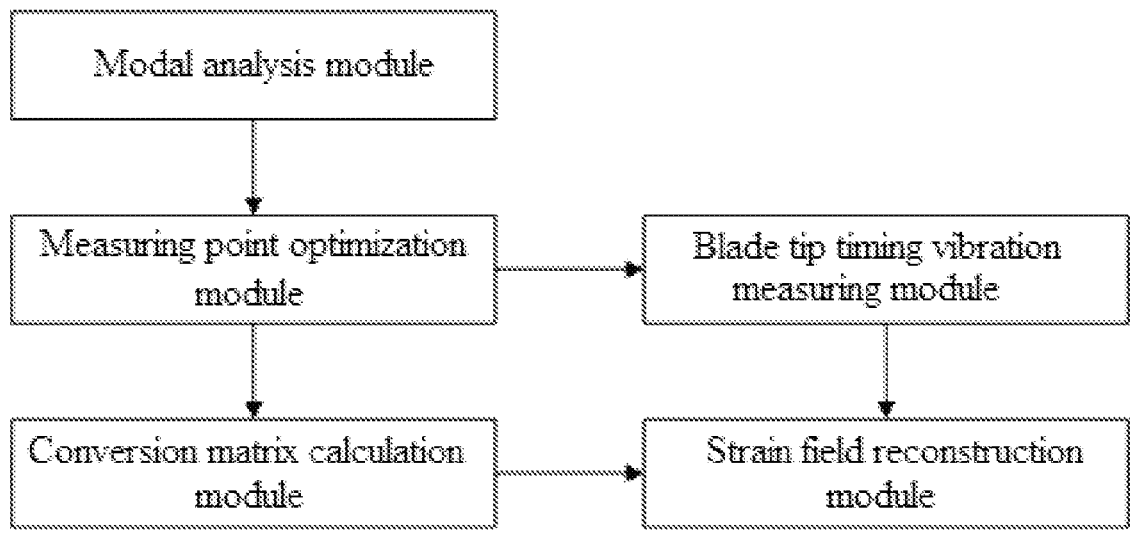
Figure 2B:
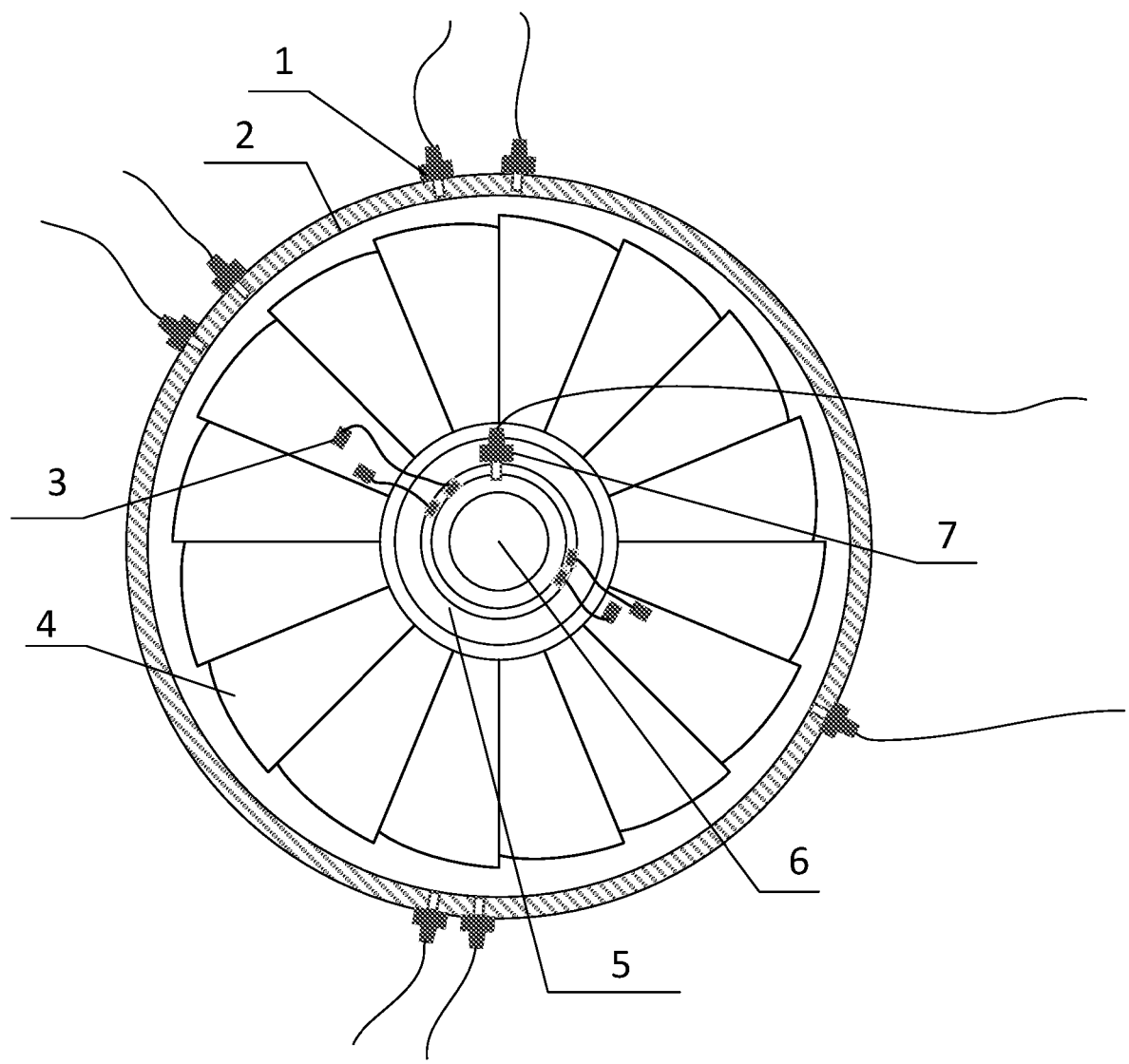
Figure 3:
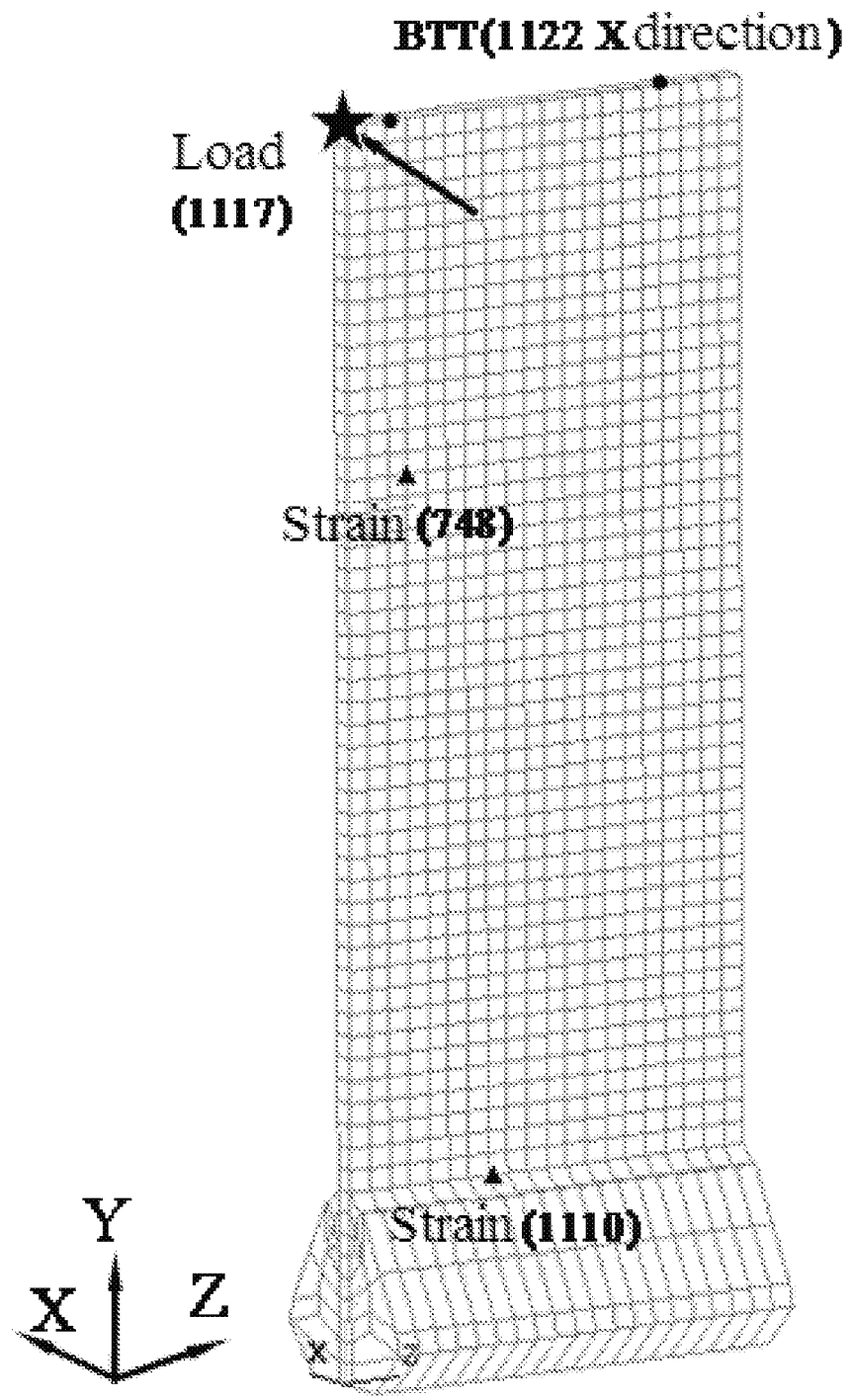
FIG. 3 is a schematic diagram of simulating a dynamic load excitation position of the rotor blade and measuring point positions of blade tip timing sensors (BTT) in one embodiment.
Figure 4A:
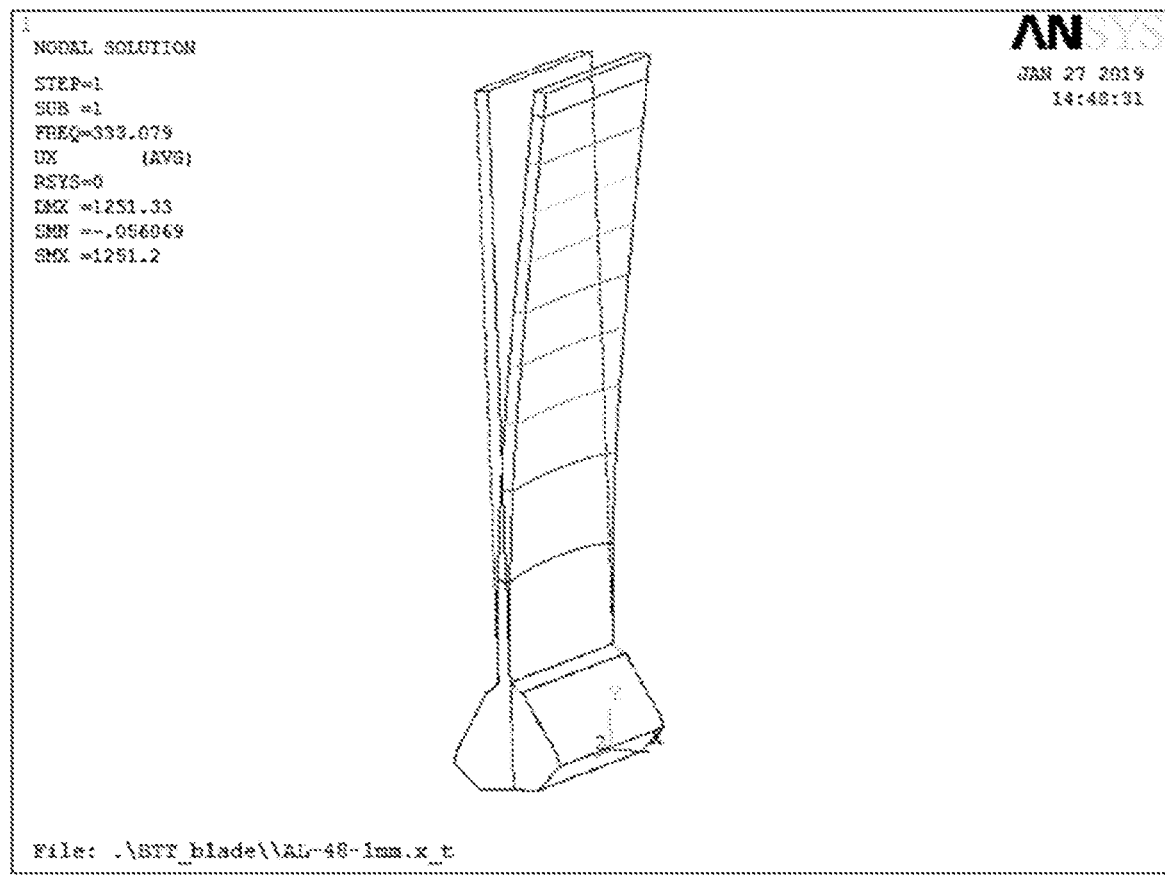
Figure 4B:
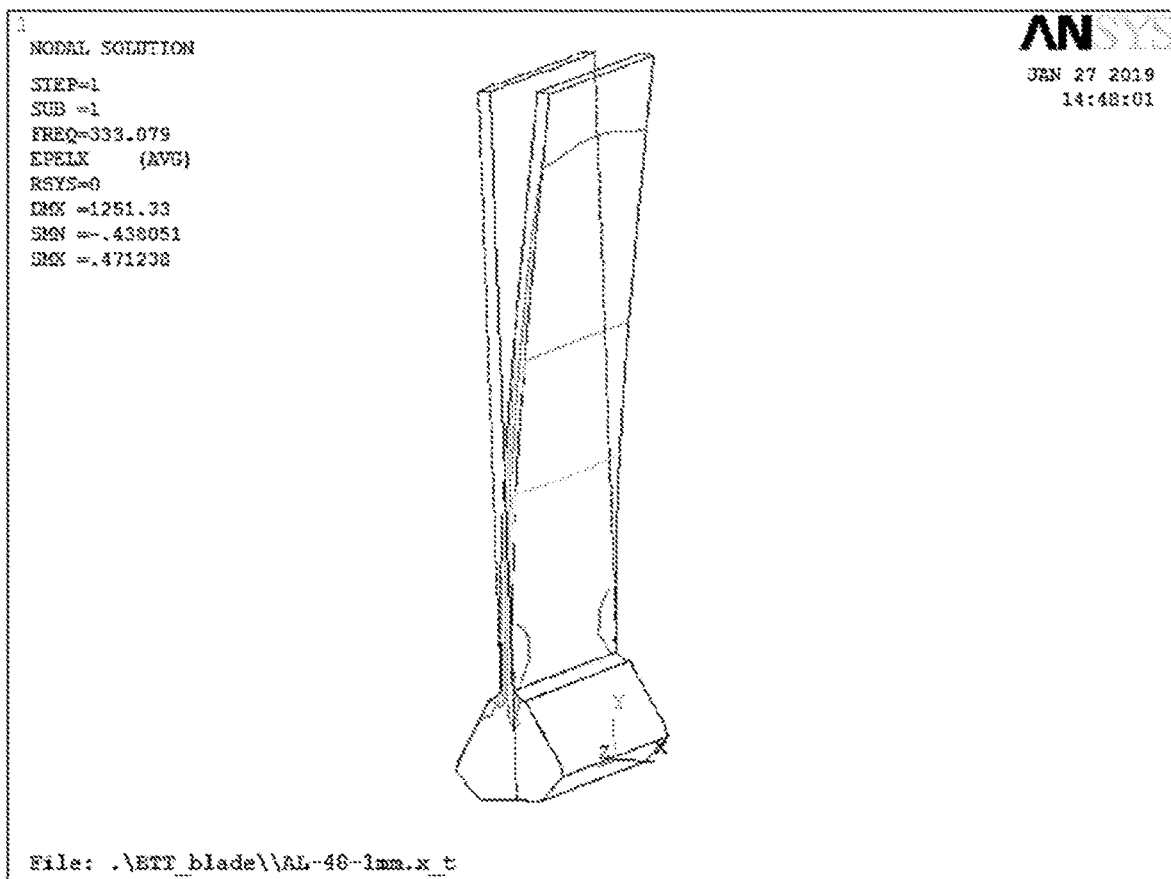
Figure 4C:
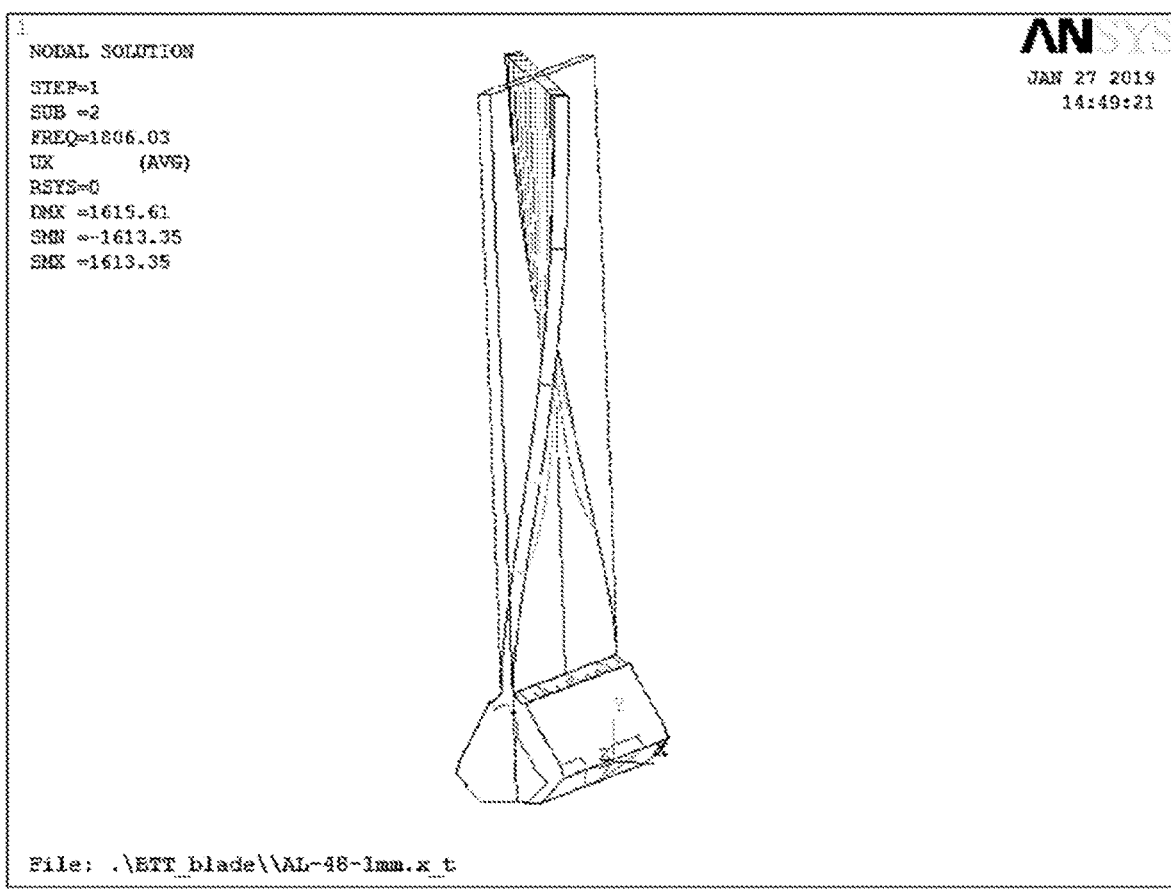
Figure 4D:
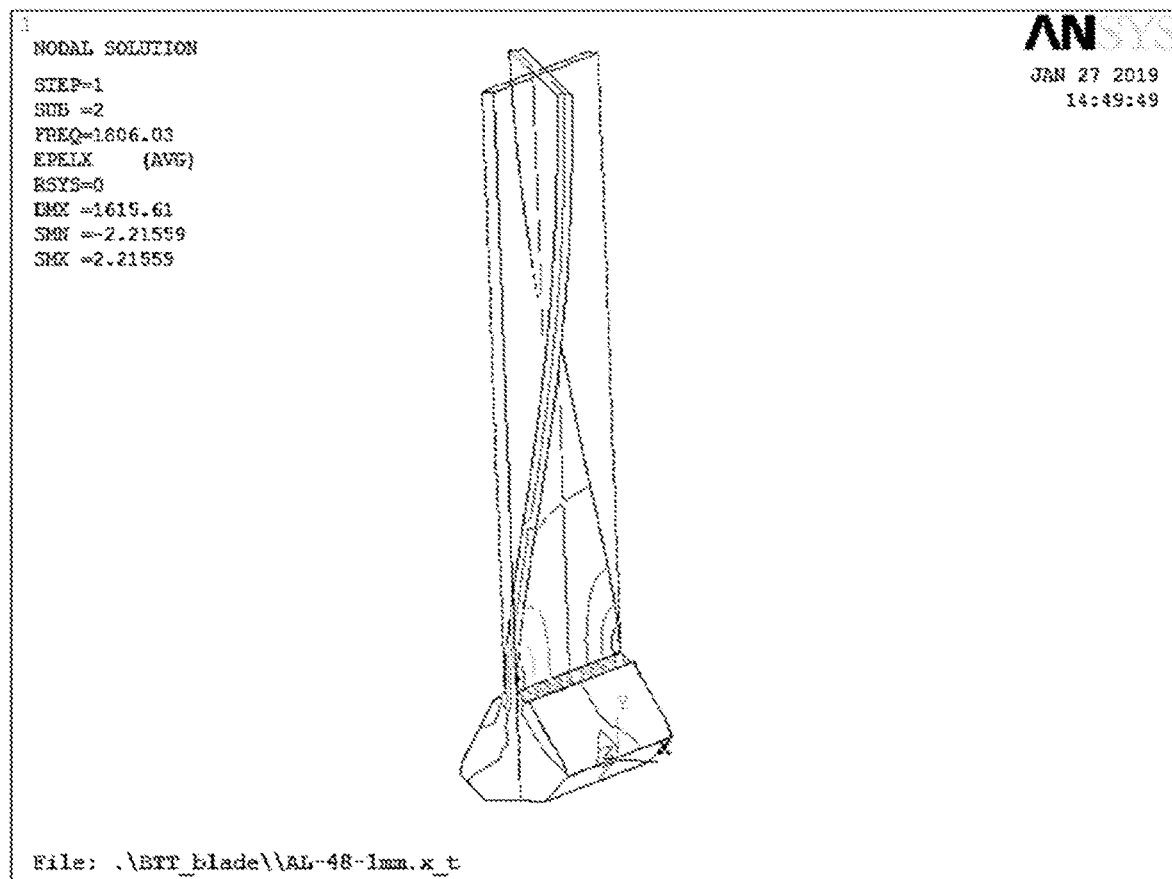
Figure 4E:
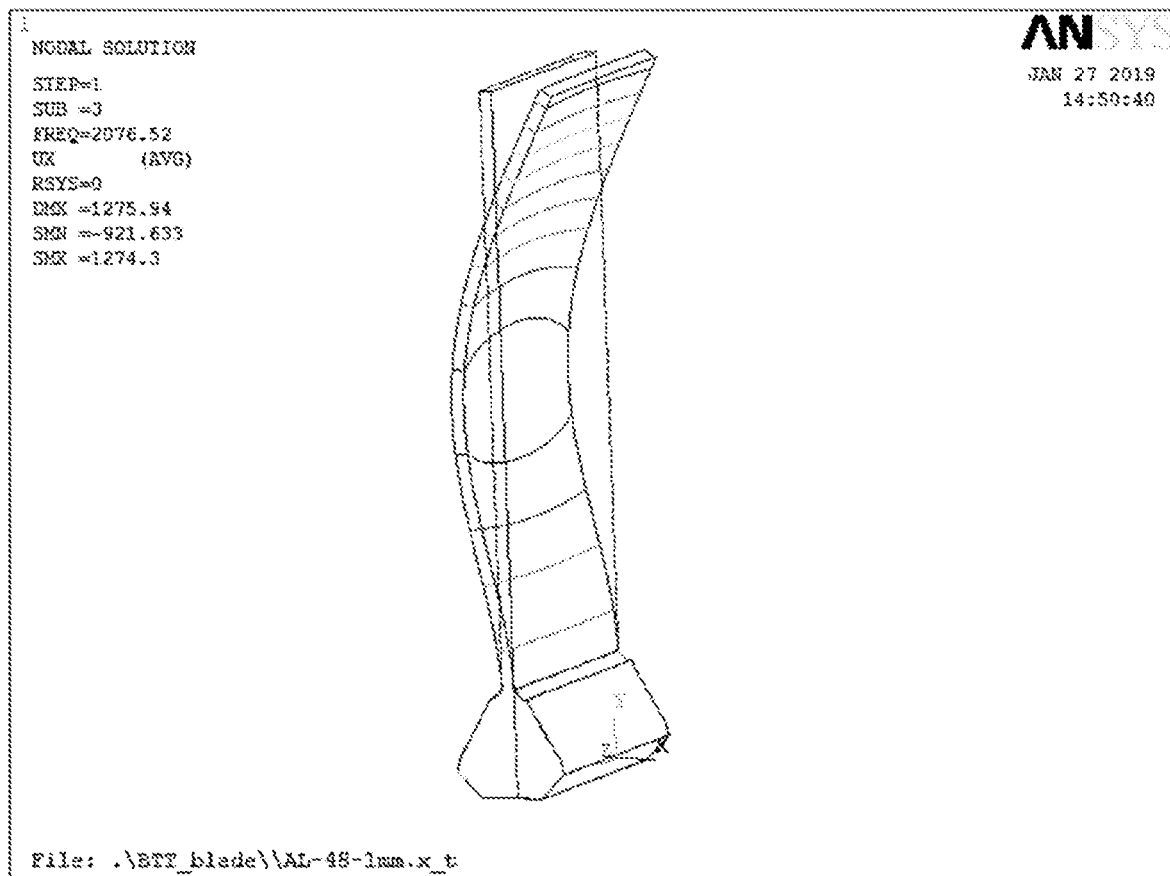
Figure 4F:
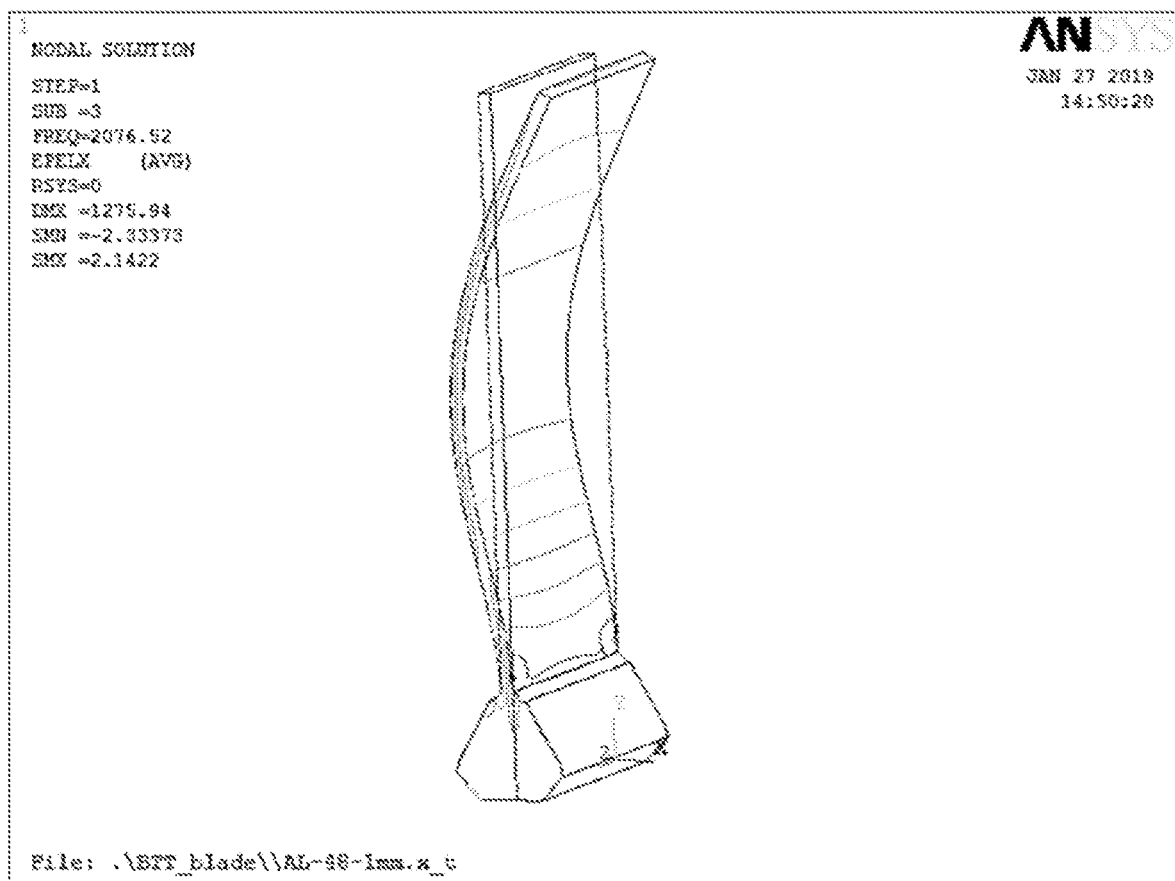

FIG. 1 is a schematic process diagram of the dynamic strain field measuring method for the rotor blade based on blade tip timing, completed by the present invention, and according to the method, blade tip single-point vibration is measured by using blade tip timing sensors mounted in the circumferential direction of the casing, multimodal vibration decoupling is realized by utilizing the circumferential Fourier fitting method, and a conversion relationship between blade tip displacement measuring points of the rotor blade and the strains of all the nodes in a full field is established, so that reconstruction of the dynamic strain field of the blade is realized; and FIG. 2(*a*) to FIG. 2(*b*) are schematic structural diagrams of a dynamic strain field measuring system for the rotor blade based on blade tip timing, provided by the present invention, wherein 1—blade tip timing sensor, 2—rotor casing, 3—strain gauge, 4—rotor blade, 5—wheel disc, 6—rotor, and 7—rotating speed sensor, and the method includes the specific steps as follows:

1) the modal parameters of the three-dimensional finite element model of the blade are extracted: referring to FIG. 3, the three-dimensional finite element model simulating the rotor straight-panel blade is established by utilizing ANSYS finite element analysis software, wherein the three-dimensional finite element model is made of aluminum with the density being 2700 kg/m<3>, the Poisson ratio being 0.33 and the elasticity modulus being 72000 Mpa; the blade has the length of 48 mm, the thickness of 1 mm and the width of 20 mm; a finite element is an entity unit SOLID185 and has 3153 nodes in total; and the two side surfaces of a blade root are fixedly restricted to simulate the actual working state of the rotor blade;

the first three order modal parameters, namely $n_m=3$ modal frequencies $f_i$, a displacement modal shape $\phi_i$ with the size being $n_{dof} \times 1$ and a strain modal shape $\psi_i$ with the size being $2n_{dof} \times 1$, are extracted by ANSYS modal analysis, wherein the first three order modal frequencies are respectively $f_1=333.08$ Hz, $f_2=1806.03$ Hz and $f_3=2076.52$ Hz; and a full-field strain modal shape matrix, $\psi=[\psi_1,\psi_2, \ldots ,\psi_{n_m}]$ with the size being $2n_{dof} \times n_m$, of the rotor blade is constructed, and the shape refers to FIG. 4(*a*) to FIG. 4(*f*), wherein i represents for the modal order, $n_{dof}=9459$ represents for the number of degrees of freedom of the finite element model of the blade, $n_{dof}=3n_n$, and $n_n=3153$ represents for the number of nodes of the finite element model of the blade; and the strains include the six strain components in total, including the three positive strains $\varepsilon_x$, $\varepsilon_y$, $\varepsilon_z$ and the three shearing strains $\gamma_{xy}$, $\gamma_{yz}$, $\gamma_{xz}$, namely each node has the six strain modal shapes.

2) The number and circumferential mounting positions of the blade tip timing sensors are determined: the relationship between the number $n_{btt}$ of the blade tip timing sensors mounted in the circumferential direction of the rotor blade casing and the multimodal number $n_m$ of vibration is that: $n_{btt} \geq 2n_m+1$; in the solution, first three order vibration modes of the simulated rotor blade are concerned, and $n_m=3$; the number of the blade tip timing sensors in the circumferential direction of the casing is at least $n_{btt}=7$; the measuring point selection matrix $S_{btt}$ arranged in the circumferential direction of the blade tip timing sensor casing under multimodal excitation is constructed:

$$S_{btt} = \begin{bmatrix} 1 & \sin(EO_1\theta_1) & \cos(EO_1\theta_1) & \ldots & \sin(EO_{n_m}\theta_1) & \cos(EO_{n_m}\theta_1) \\ 1 & \sin(EO_1\theta_2) & \cos(EO_1\theta_2) & \ldots & \sin(EO_{n_m}\theta_2) & \cos(EO_{n_m}\theta_2) \\ \vdots & \vdots & \vdots & \vdots & \vdots & \vdots \\ 1 & \sin(EO_1\theta_{n_{btt}}) & \cos(EO_1\theta_{n_{btt}}) & \ldots & \sin(EO_{n_m}\theta_{n_{btt}}) & \cos(EO_{n_m}\theta_{n_{btt}}) \end{bmatrix}$$

wherein the size of the measuring point selection matrix $S_{btt}$ is $n_{btt} \times (2n_m+1)=7 \times 7$, $\theta_j$ represents for the layout angles of the blade tip timing sensors j ($j=1, \ldots n_{btt}$) in the casing, $n_{btt}$ represents for the total number of the $j(j=1, \ldots n_{btt})^{th}$ blade tip timing sensors arranged in the circumferential direction, and $EO_i$ represents for the concerned excitation order ($i=1, \ldots n_m$); $\theta_j$ represents for the mounting angle of the $j^{th}$ blade tip timing sensor in the casing; the three excitation orders concerned in the solution are respectively 4, 18 and 23, and the first three order vibration modes of the rotor blade are simultaneously excited at the same rotating speed; the position where the rotating speed sensor is located serves as the reference 0°, the limited mounting angle range of the casing is removed, and the $n_{btt}=7$ angles are randomly selected in the circumferential direction of the casing to serve as the mounting positions of the blade tip timing sensors; and the condition number κ of the blade tip timing measuring point selection matrix $S_{btt}$ is calculated; the random process is repeated for R=500 times, and a measuring point layout solution when the condition number κ of the matrix is minimum is selected therefrom. The circumferential mounting angles of the selected seven blade tip timing sensors are 3.12°, 117.33°, 183.42°, 189.58°, 303.71°, 315.14° and 351.08°, and the condition number of the corresponding measuring point selection matrix btt is $S_{btt}$ is 3.4694.

3) the mapping relationship between the single-point displacement and the full-field dynamic strains of the blade is established: a conversion matrix, $$T = \left[ \frac{\psi_1}{\phi_{btt,1}}, \frac{\psi_2}{\phi_{btt,2}}, \ldots, \frac{\psi_i}{\phi_{btt,i}}, \ldots, \frac{\psi_{n_m}}{\phi_{btt,n_m}} \right]$$

with the size being $2n_{dof} \times n_d = 18918 \times 3$, of the single-point displacement and the full-field dynamic strains of the blade is constructed, wherein $\phi_{btt,i}$ represents for the $i^{th}$ order displacement modal shape of the blade tip timing measuring point.

Figure 5:
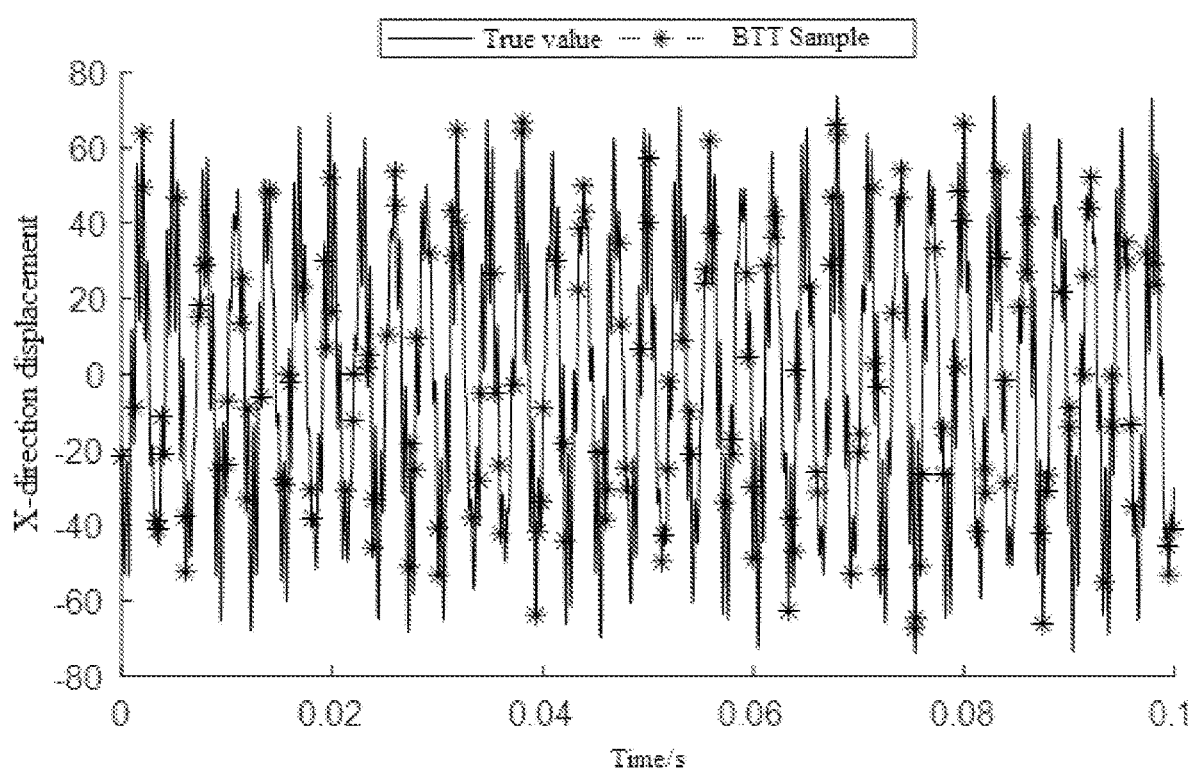
FIG. 5 is blade tip displacement vibration signals actually measured by seven blade tip timing sensors of the rotor blade in one embodiment.

4) The blade tip single-point displacement of the rotor blade is acquired based on the blade tip timing sensors: the simulated rotor blade is subjected to transient analysis in the ANSYS finite element software, a mass damping coefficient is set as $\alpha=12.1380$ a stiffness damping coefficient is set as $\beta=8.1986\times10^8$, a rotating speed is set to be 15000 RPM, multimodal vibration of an aerodynamic load to the rotor blade is simulated, multi-frequency harmonic excitation $f(t)=\cos(2\pi f_1 t)+10\cos(2\pi f_2 t)+20\cos(2\pi f_3 t)$ is applied to an X direction of a No. 1117 node of a blade tip, and a strain field which is subjected to transient analysis to be stabilized is taken as a reference of a reconstruction result; the blade tip multimodal vibration signals $u_{btt}(t)$ on the $N^{th}$ turn of the rotor blade is acquired by the $n_{btt}=7$ blade tip timing sensors, referring to FIG. 5, wherein the blade tip timing sensors sample seven data of the vibration signal in the X-direction of the No. 1122 node of the blade tip every time when the rotor blade rotates for a cycle, 25 cycles of 175 data are acquired in total, and therefore, blade tip timing signals are seriously undersampled; and meanwhile, FIG. 5 shows that the data length of the vibration signal in the X-direction of the No. 1122 node of the blade tip under the sampling frequency $f_s=25000$ Hz is N=2500, and the sampling time is $t=N/f_s=0.1$ s.

Figure 6:
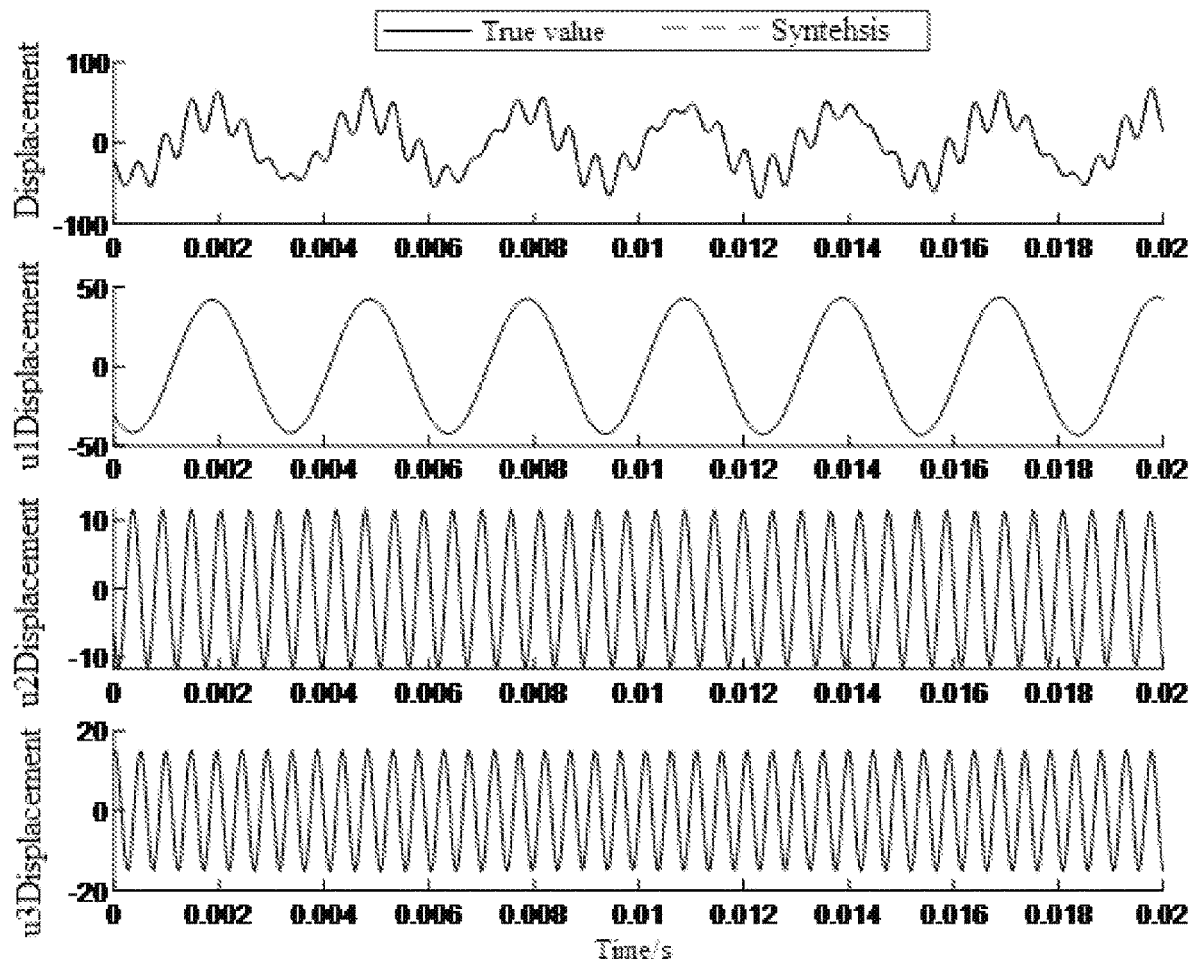
FIG. 6 is a multimodal decoupling result of a displacement signal of the rotor blade in one embodiment.

The $n_m$ order vibration parameter $\beta=(S_{btt})^\dagger u_{btt}(t)$ is acquired by utilizing the circumferential Fourier fitting algorithm, wherein $\beta=[c,A_1\cos(\varphi_1),A_1\sin(\varphi_1),\ldots,A_{n_m}\cos(\varphi_{n_m}),A_{n_m}\sin(\varphi_{n_m})]^T$, $A_i$ represents for the vibration amplitude, $f_i$ represents for the modal frequency, and $\varphi_i$ represents for the initial phase; the superscript † represents for the inversion of the matrix; the superscript T represents for the transposition of the vector; and further, the blade tip single-point multimodal vibration signals are acquired by reconstruction:

$$u_{btt}(t) = c + \sum_{i=1}^{n} u_{btt,i}(t) = c + \sum_{i=1}^{n} A_i \sin(\omega_i t + \varphi_i) = c + \sum_{i=1}^{n} A_i \cos(\varphi_i)\sin(\omega_i t) + A_i \sin(\varphi_i)\cos(\omega_i t)$$

wherein $u_{btt,i}(t)$ represents for the decoupled $i^{th}$ order vibration signals, c represents for static deformation of the blade, $\omega_i$ represents for the circular frequency of multimodal vibration of the blade, and t represents for the vibration moment of the blade. FIG. 6 gives first three order vibration modal decoupling results of a displacement signal of the rotor blade in the embodiment.

5) Strains of all the nodes on the surface of and inside the blade at each turn of the rotor blade are calculated according to the formula $S(t)=T[u_{btt,1},u_{btt,2},\ldots,u_{btt,i},\ldots,u_{btt,n_m}]^T$ to obtain $S(t)=[\varepsilon_{1,x},\varepsilon_{1,y},\varepsilon_{1,z},\gamma_{1,xy},\gamma_{1,yz},\gamma_{1,xz},\ldots,\varepsilon_{i,x},\varepsilon_{i,y},\varepsilon_{i,z},\gamma_{i,xy},\gamma_{i,yz},\gamma_{i,xz},\ldots,\varepsilon_{n_m,x},\varepsilon_{n_m,y},\varepsilon_{n_m,z},\gamma_{n_m,xy},\gamma_{n_m,yz},\gamma_{n_m,xz}]^T$, wherein the strains $S(t)$ include the positive strains and the shearing strains.

Figure 7A:
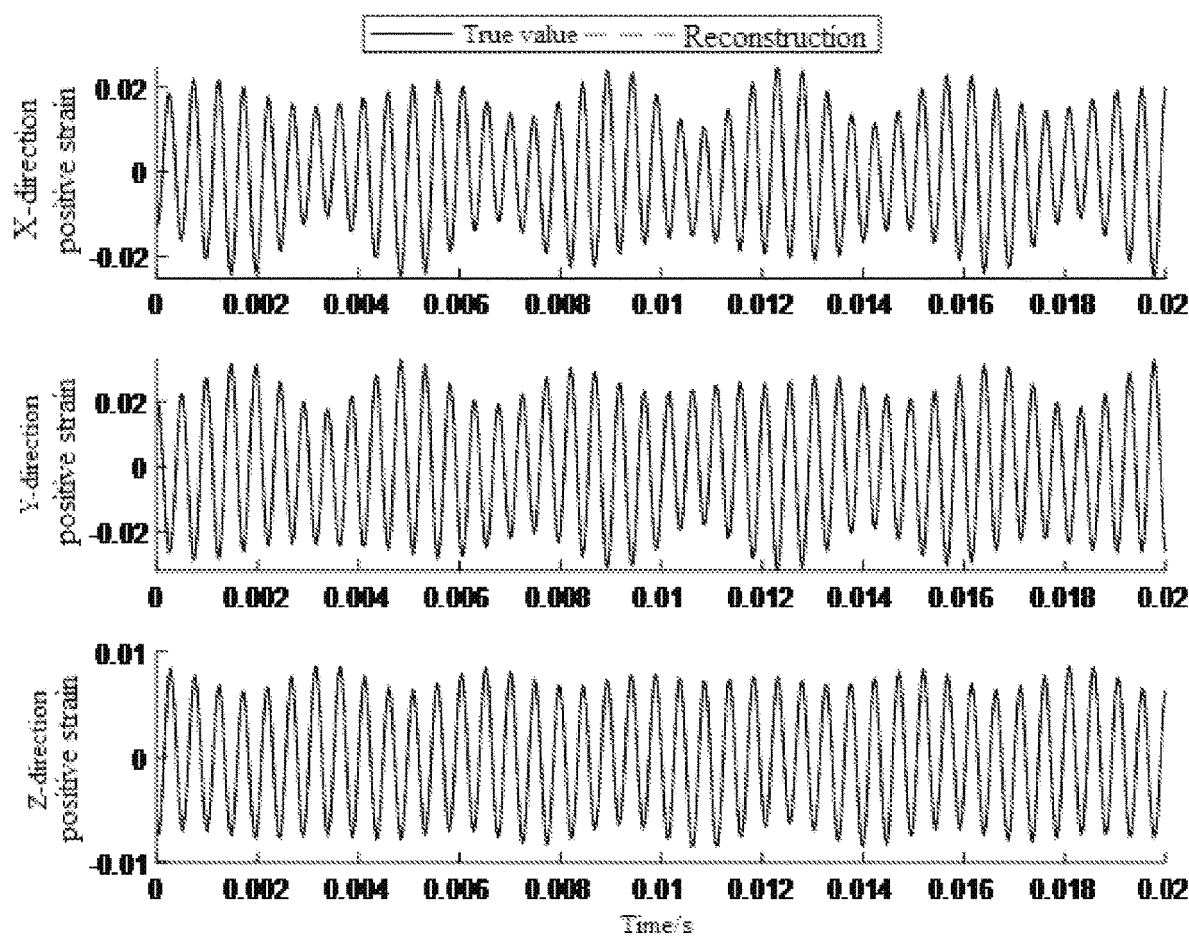
Figure 7B:
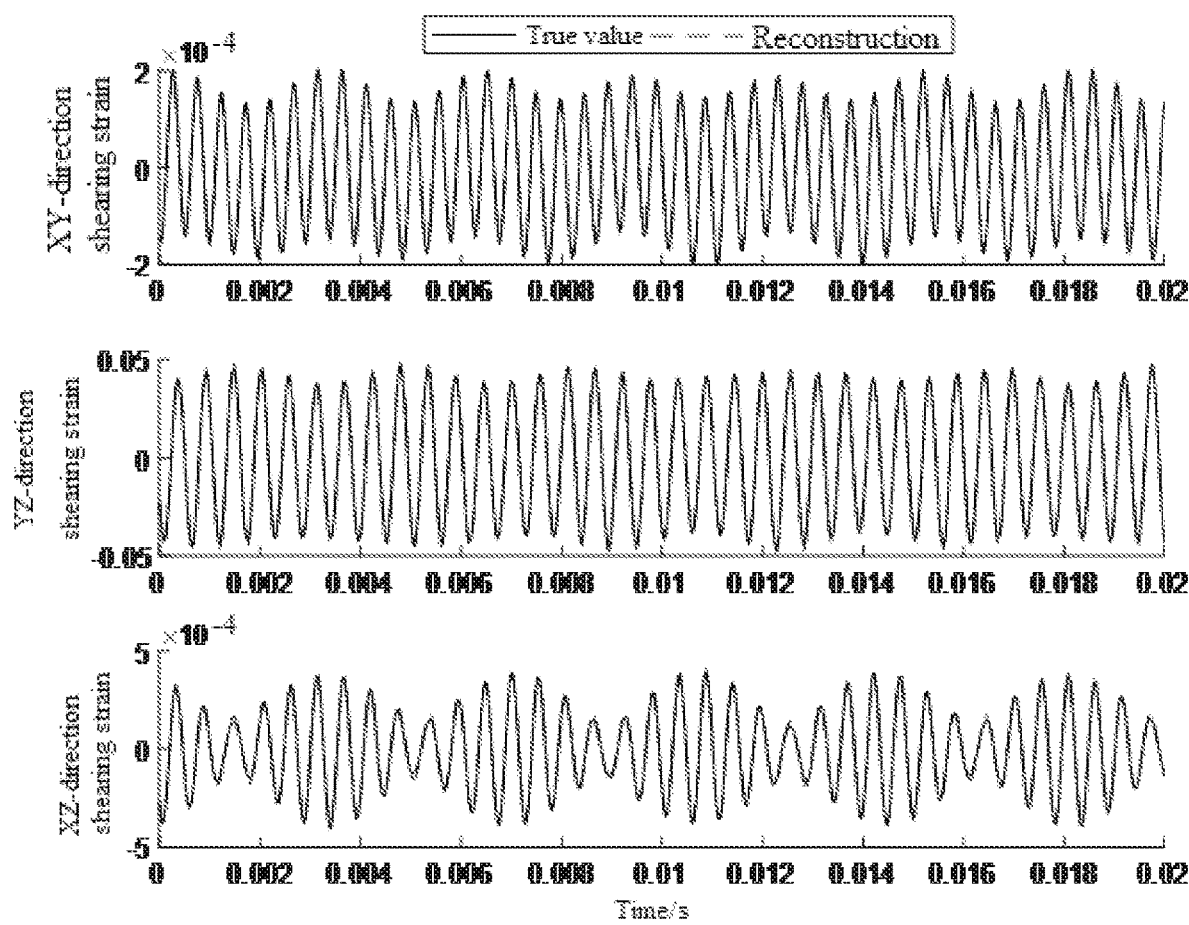
Figure 8A:
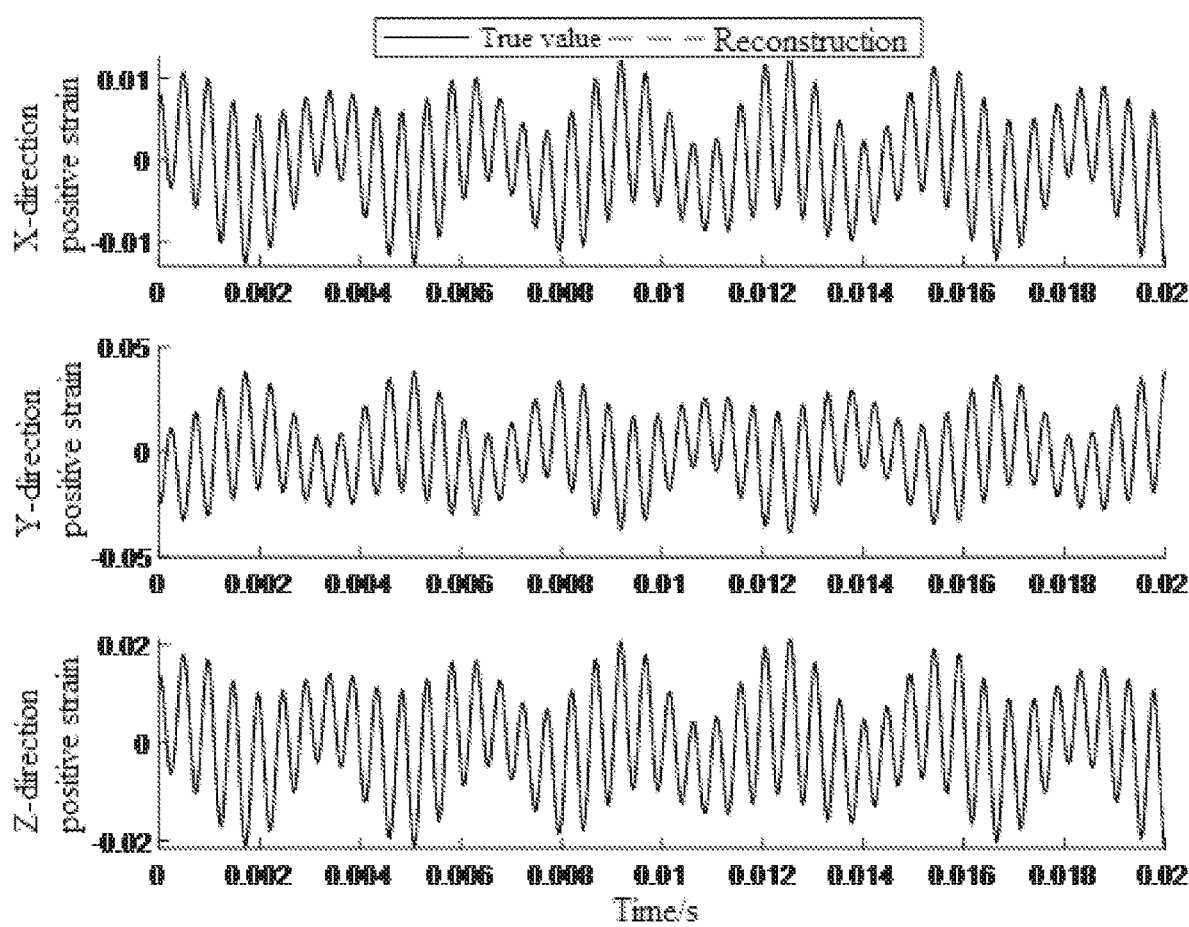
Figure 8B:
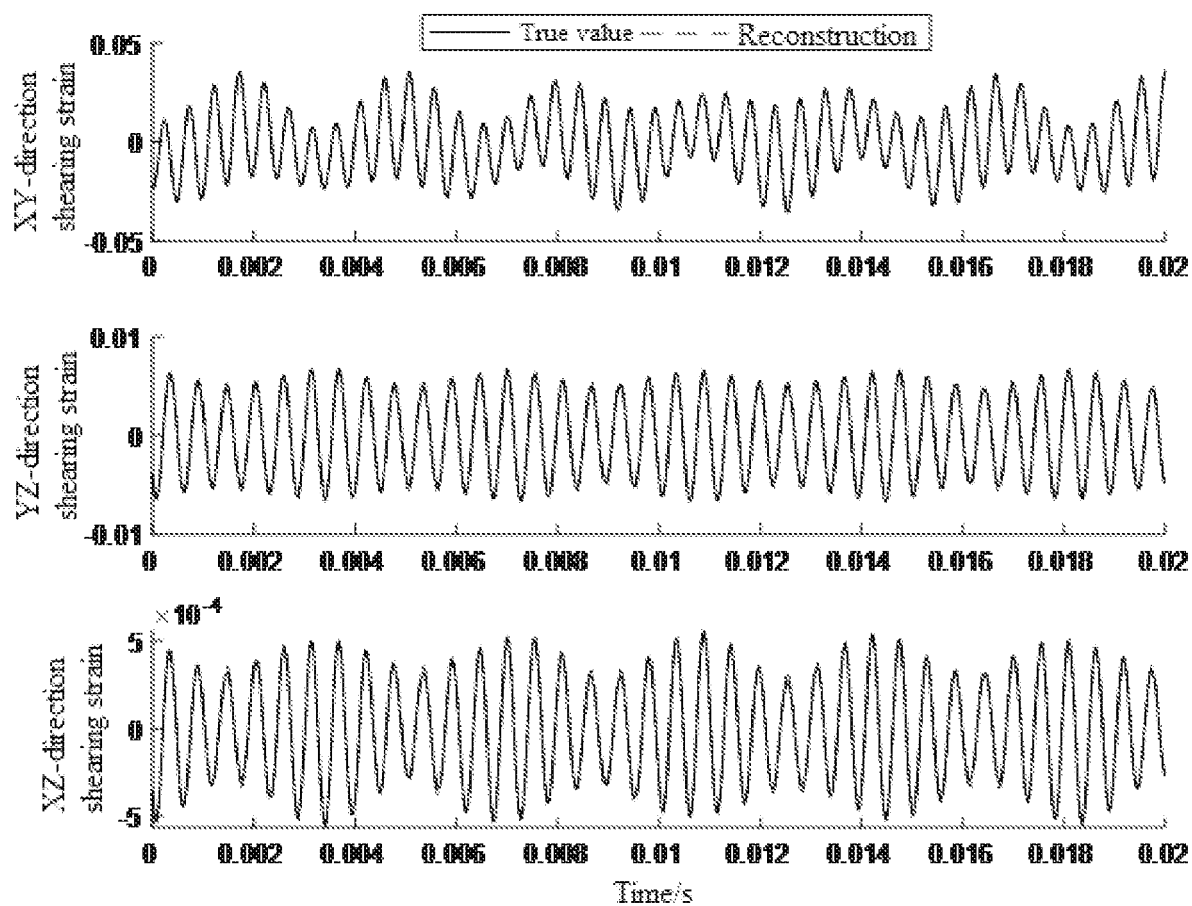

With the No. 748 node on a blade body and the No. 1100 node on a blade root of the rotor blade as typical examples (referring to FIG. 3) of high-precision reconstruction of the dynamic strain field, the conclusion is also suitable for the other nodes. FIG. 7(a) to FIG. 7(b) are comparison results of the dynamic strains of the No. 748 node on the blade body in a reconstructed strain field of the rotor blade in one embodiment and true dynamic strains; FIG. 8(a) to FIG. 8(b) are comparison results of the dynamic strains of the No. 1100 node on the blade root in the reconstructed strain field of the rotor blade in one embodiment and the true dynamic strains. Known from FIG. 7(a) to FIG. 7(b) and FIG. 8(a) to FIG. 8(b), reconstructed dynamic strain signals are highly consistent with the true dynamic strains; in order to quantitatively evaluate the performance of the dynamic strain field measuring method for the rotor blade in the present invention, a relative error of the reconstructed signals and the true strains is calculated within the range $t\in[0, 0.1]$ s relative errors of the three positive strains of the No. 748 node on the blade body in FIG. 7(a) are respectively 4.41%, 4.69% and 5.77%, and relative errors of the three shearing strains $\gamma_{xy}$, $\gamma_{yz}$, $\gamma_{xz}$ of the No. 748 node on the blade body in FIG. 7(b) are respectively 6.24%, 6.21% and 9.63%; and relative errors of the three positive strains $\varepsilon_x$, $\varepsilon_y$, $\varepsilon_z$ of the No. 1100 node on the blade root in FIG. 8(a) are respectively 4.41%, 4.41% and 4.41%, and relative errors of the three shearing strains $\gamma_{xy}$, $\gamma_{yz}$, $\gamma_{xz}$ of the No. 1100 node on the blade root in FIG. 8(b) are respectively 4.40%, 7.81% and 8.09%. Therefore, the dynamic strain field measuring method for the rotor blade based on blade tip timing, provided by the present invention, may be used for high-precision reconstruction of the dynamic strain field of the blade.

According to the method provided by the present invention, the reconstruction of the overall dynamic strain field of the rotor blade is realized by only utilizing the blade tip finite measuring points, and the measurement of the positive strains and the shearing strains of all the nodes on the surface of and inside the rotor blade under multimodal vibration can be realized, the method is simple in calculation process, and online measurement is easy. The above descriptions are only preferred embodiments of the present invention, and the measuring method can be applied to vibration tests of fans/gas compressors/turbine blades of rotating machinery such as an aircraft engine, a gas turbine and a steam turbine, but is not intended to limit the present invention.

In another embodiment, the method includes the following steps:

1) modal parameters of a three-dimensional finite element model of a blade are extracted;
2) the number and circumferential mounting positions of blade tip timing sensors are determined;
3) a mapping relationship between single-point displacement and full-field dynamic strains of the blade is established;
4) blade tip single-point displacement of the rotor blade is acquired by utilizing the blade tip timing sensors; and
5) the dynamic strain measurement in any position and direction of the rotor blade is realized.

Further, in step 1), the three-dimensional finite element model of the rotor blade is established, first $n_m$ order modal parameters: a modal frequency $f_i$, a displacement modal shape $\phi_i$ with the size being $n_{dof}\times1$ and a strain modal shape $\psi_i$ with the size being $2n_{dof}\times1$ are extracted by $$S_{btt} = \begin{bmatrix} 1 & \sin(EO_1\theta_1) & \cos(EO_1\theta_1) & \ldots & \sin(EO_{n_m}\theta_1) & \cos(EO_{n_m}\theta_1) \\ 1 & \sin(EO_1\theta_2) & \cos(EO_1\theta_2) & \ldots & \sin(EO_{n_m}\theta_2) & \cos(EO_{n_m}\theta_2) \\ \vdots & \vdots & \vdots & \vdots & \vdots & \vdots \\ 1 & \sin(EO_1\theta_{n_{btt}}) & \cos(EO_1\theta_{n_{btt}}) & \ldots & \sin(EO_{n_m}\theta_{n_{btt}}) & \cos(EO_{n_m}\theta_{n_{btt}}) \end{bmatrix}$$

modal analysis; a full-field strain modal shape matrix, $\psi=[\psi_1,\psi_2,\ldots,\psi_{n_m}]$, with the size being $2n_{dof}\times n_m$, of the rotor blade is constructed; i represents for a modal order, $n_{dof}$ represents for the number of degrees of freedom of the finite element model of the blade, $n_{dof}=3n_n$, and $n_n$ represents for the number of nodes of the finite element model of the blade; and the strains include six strain components in total, including three positive strains $\varepsilon_x$, $\varepsilon_y$, $\varepsilon_z$ and three shearing strains $\gamma_{xy}$, $\gamma_{yz}$, $\gamma_{xz}$, namely each node has the six strain modal shapes.

Further, in step 2), a relationship between the number $n_{btt}$ of the blade tip timing sensors mounted in a circumferential direction of a rotor blade casing and the multimodal number $n_m$ of vibration is that: $n_{btt} \geq 2n_m+1$; and a measuring point selection matrix $S_{btt}$ arranged in a circumferential direction of a blade tip timing sensor casing under multimodal excitation is constructed:

wherein the size of the measuring point selection matrix $S_{btt}$ is $n_{btt}\times(2n_m+1)$, $EO_i$ represents for a concerned excitation order, and $\theta_j$ represents for a mounting angle of the $j^{th}$ blade tip timing sensor in the casing; the position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; the condition number $\kappa$ of the blade tip timing measuring point selection matrix $S_{btt}$ is calculated; and the random process is repeated for R times, and a measuring point layout solution when the condition number $\kappa$ of the matrix is minimum is selected therefrom.

Further, in step 3), a conversion matrix, $$T = \left[\frac{\psi_1}{\phi_{btt,1}}, \frac{\psi_2}{\phi_{btt,2}}, \ldots, \frac{\psi_i}{\phi_{btt,i}}, \ldots, \frac{\psi_{n_m}}{\phi_{btt,n_m}}\right]$$

with the size being $2n_{dof}\times n_d$, of the single-point displacement and the full-field dynamic strains of the blade is constructed, wherein $\phi_{btt,i}$ represents for an $i^{th}$ order displacement modal shape of a blade tip timing measuring point.

Further, in step 4), blade tip multimodal vibration signals $u_{btt}(t)$ on the $N^{th}$ turn of the rotor blade is acquired by the $n_{btt}$ blade tip timing sensors, and furthermore, an $n_m$ order vibration parameter $\beta=(S_{btt})^\dagger u_{btt}(t)$ is acquired by utilizing a circumferential Fourier fitting algorithm, wherein $\beta=[c,A_1\cos(\varphi_1),A_1\sin(\varphi_1),\ldots,A_{n_m}\cos(\varphi_{n_m}),A_{n_m}\sin(\varphi_{n_m})]^T$, $A_i$ represents for a vibration amplitude, $f_i$ represents for a modal frequency, and $\phi_i$ represents for an initial phase; the superscript $\dagger$ represents for the inversion of the matrix; the superscript T represents for the transposition of a vector; and further, a blade tip single-point multimodal vibration signal is acquired by reconstruction:

$$u_{btt}(t) = c + \sum_{i=1}^{n} u_{btt,i}(t) =$$
$$c + \sum_{i=1}^{n} A_i \sin(\omega_i t + \varphi_i) = c + \sum_{i=1}^{n} A_i\cos(\varphi_i)\sin(\omega_i t) + A_i\sin(\varphi_i)\cos(\omega_i t)$$

wherein $u_{btt,i}(t)$ represents for decoupled $i^{th}$ order vibration signals, and c represents for static deformation of the blade.

Further, in step 5), the strains of all the nodes on the surface of and inside the blade at each turn of the rotor blade are calculated according to a formula $S(t)=T[u_{btt,1}, u_{btt,2},\ldots,u_{btt,i},\ldots,u_{btt,n_m}]^T$ to obtain $S(t)=[\varepsilon_{1,x},\varepsilon_{1,y},\varepsilon_{1,z},\gamma_{1,xy},\gamma_{1,yz},\gamma_{1,xz},\ldots,\varepsilon_{i,x},\varepsilon_{i,y},\varepsilon_{i,z},\gamma_{i,xy},\gamma_{i,yz},\gamma_{i,xz},\ldots,\varepsilon_{n_m,x},\varepsilon_{n_m,y},\varepsilon_{n_m,z},\gamma_{n_m,xy},\gamma_{n_m,yz},\gamma_{n_m,xz}]^T$, wherein the strains S(t) include the positive strains and the shearing strains.

On the other hand, a measuring system for implementing the method includes:

a plurality of blade tip timing sensors 1 arranged on a rotor blade casing 2;

a blade tip timing vibration measuring module connected with the blade tip timing sensors so as to measure circumferential blade tip multimodal vibration signals of a rotor blade 4; and a calculation unit connected with the blade tip timing vibration measuring module, and the calculation unit including:

a modal analysis module configured to perform modal analysis based on a three-dimensional finite element model of a to-be-measured rotor blade so as to acquire a displacement modal shape $\phi_i$ of first $n_m$ order modal frequency $f_i$, of the rotor blade and construct a full-field strain modal shape matrix $\psi=[\psi_1,\psi_2,\ldots,\psi_{n_m}]$ of the rotor blade;

a measuring point optimization module configured to optimize the number of measuring points of the blade tip timing sensors arranged on the rotor blade, wherein a measuring point selection matrix $S_{btt}$ arranged in the circumferential direction of a blade tip timing sensor casing under multimodal excitation is constructed, the position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number $\kappa$ of the blade tip timing measuring point selection matrix $S_{btt}$ is calculated, a random process is repeated for R times, and a measuring point layout when the condition number $\kappa$ of the matrix is minimum is selected therefrom;

a conversion matrix calculation module configured to construct a conversion matrix of single-point displacement and full-field dynamic strains of the blade; and a strain field reconstruction module configured to calculate the positive strains and shearing strains of all nodes on the surface of and inside the blade at each turn of the rotor blade according to a formula $S(t)=T[u_{btt,1}, u_{btt,2},\ldots,u_{btt,i},\ldots,u_{btt,n_m}]^T$ to obtain $S(t)=[\varepsilon_{1,x},\varepsilon_{1,y},\varepsilon_{1,z},\gamma_{1,xy},\gamma_{1,yz},\gamma_{1,xz},\ldots,\varepsilon_{i,x},\varepsilon_{i,y},\varepsilon_{i,z},\gamma_{i,xy},\gamma_{i,yz},\gamma_{i,xz},\ldots,\varepsilon_{n_m,x},\varepsilon_{n_m,y},\varepsilon_{n_m,z},\gamma_{n_m,xy},\gamma_{n_m,yz},\gamma_{n_m,xz}]^T$, wherein the strains S(t) include positive strains and shearing strains.

In one embodiment, the blade tip timing vibration measuring module includes the rotating speed sensor, a signal conditioning module and a time-displacement conversion module.

In one embodiment, the measuring system further includes a display unit and a wireless communication device, and the wireless communication device includes a 4G/GPRS or an internet communication module.

In one embodiment, the modal analysis module, the measuring point optimization module, the conversion matrix calculation module or a dynamic strain field reconstruction module is a general-purpose processor, a digital signal processor, an application-specific integrated circuit (ASIC) or a field-programmable gate array (FPGA).

In one embodiment, the modal analysis module, the measuring point optimization module, the conversion matrix calculation module or the dynamic strain field reconstruction module includes a memory, and the memory includes one or more read-only memories (ROMs), random access memories (RAMs), flash memories or electronic erasable programmable read only memories (EEPROMs).

In one embodiment, a system for the dynamic strain field measuring method for the rotor blade based on blade tip timing includes:

on the other hand, the present invention further provides the system for the above-mentioned dynamic strain field measuring method for the rotor blade based on blade tip timing, including:

the modal analysis module configured to perform modal analysis on the three-dimensional finite element model of the blade by utilizing finite element analysis software to extract the first $n_m$ order modal parameters: the modal frequency $f_i$, the displacement modal shape $\phi_i$ with the size being $n_{dof} \times 1$ and a strain modal shape $\psi_i$ with the size being $2n_{dof} \times 1$; and to construct the full-field strain modal matrix, $\psi=[\psi_1, \psi_2, \ldots, \psi_{n_m}]$ with the size being $2n_{dof} \times n_m$, of the rotor blade, wherein i represents for the modal order, $n_{dof}$ represents for the number of degrees of freedom of the finite element model of the blade, $n_{dof}=3n_n$, $n_n$ represents for the number of the nodes of the finite element model of the blade, and the strains include the six strain components in total, including the three positive strains $\varepsilon_x$, $\varepsilon_y$, $\varepsilon_z$ and the three shearing strains $\gamma_{xy}$, $\gamma_{yz}$, $\gamma_{xz}$, namely each node has the six strain modal shapes;

The measuring point optimization module configured to optimize the relationship, $n_{btt} \geq 2n_m+1$, between the number $n_{btt}$ of the blade tip timing sensors mounted in the circumferential direction of the rotor blade casing and the multimodal number $n_m$ of vibration; and to construct the measuring point selection matrix $S_{btt}$ arranged in the circumferential direction of the blade tip timing sensor casing under multimodal excitation:

$S_{btt} =$ $$\begin{bmatrix} 1 & \sin(EO_1\theta_1) & \cos(EO_1\theta_1) & \ldots & \sin(EO_{n_m}\theta_1) & \cos(EO_{n_m}\theta_1) \\ 1 & \sin(EO_1\theta_2) & \cos(EO_1\theta_2) & \ldots & \sin(EO_{n_m}\theta_2) & \cos(EO_{n_m}\theta_2) \\ \vdots & \vdots & \vdots & \vdots & \vdots & \vdots \\ 1 & \sin(EO_1\theta_{n_{btt}}) & \cos(EO_1\theta_{n_{btt}}) & \ldots & \sin(EO_{n_m}\theta_{n_{btt}}) & \cos(EO_{n_m}\theta_{n_{btt}}) \end{bmatrix}$$

wherein the size of the measuring point selection matrix $S_{btt}$ is $n_{btt} \times (2n_m+1)$, $\theta_j$ represents for the layout angles of the blade tip timing sensors j ($j=1, \ldots, n_{btt}$) in the casing, $n_{btt}$ represents for the total number of the ($j=1, \ldots, n_{btt}$)$^{th}$ blade tip timing sensors arranged in the circumferential direction, $EO_i$ represents for the concerned excitation order ($i=1, \ldots, n_m$), and $\theta_j$ represents for the mounting angle of the $j^{th}$ blade tip timing sensor in the casing; the position where the rotating speed sensor is located serves as the reference 0°, the limited mounting angle range of the casing is removed, and the $n_{btt}$ angles are randomly selected in the circumferential direction of the casing to serve as the mounting positions of the blade tip timing sensors; the condition number $\kappa$ of the blade tip timing measuring point selection matrix $S_{btt}$ is calculated; and the random process is repeated for R times, and the measuring point layout solution when the condition number $\kappa$ of the matrix is minimum is selected therefrom;

the conversion matrix calculation module configured to construct the conversion matrix, $$T = \left[ \frac{\psi_1}{\phi_{btt,1}}, \frac{\psi_2}{\psi_{btt,2}}, \ldots, \frac{\psi_i}{\phi_{btt,i}}, \ldots, \frac{\psi_{n_m}}{\phi_{btt,n_m}} \right]$$

with the size being $2n_{dof} \times n_d$, of the single-point displacement and the full-field dynamic strains of the blade, wherein $\phi_{btt,i}$ represents for the $i^{th}$ order displacement modal shape of the blade tip timing measuring point;

the blade tip timing vibration measuring module including the plurality of blade tip timing sensors, the at least one rotating speed sensor, the signal conditioning module and the time-displacement conversion module; and being configured to acquire the blade tip multimodal vibration signals $u_{btt}(t)$ on the $N^{th}$ turn of the rotor blade by $n_{btt}$ blade tip timing sensors; to further acquire the $n_m$ order vibration parameter $\beta=(S_{btt})^\dagger u_{btt}(t)$ by utilizing the circumferential Fourier fitting algorithm, wherein $\beta=[c, A_1\cos(\varphi_1), A_1\sin(\varphi_1), \ldots, A_{n_m}\cos(\varphi_{n_m}), A_{n_m}\sin(\varphi_{n_m})]^T$, $A_i$ represents for the vibration amplitude, $f_i$ represents for the modal frequency, and $\varphi_i$ represents for the initial phase; and to further acquire the blade tip single-point multimodal vibration signals by reconstruction:

$$u_{btt}(t) = c + \sum_{i=1}^{n} u_{btt,i}(t) =$$
$$c + \sum_{i=1}^{n} A_i \sin(\omega_i t + \varphi_i) = c + \sum_{i=1}^{n} \left( A_i \cos(\varphi_i)\sin(\omega_i t) + A_i \sin(\varphi_i)\cos(\omega_i t) \right)$$

wherein $u_{btt,i}(t)$ represents for the decoupled $i^{th}$ order vibration signals, and c represents for static deformation of the blade; and the strain field reconstruction module configured to calculate the strains of all the nodes on the surface of and inside the blade at each turn of the rotor blade according to the formula $S(t)=T[u_{btt,1}, u_{btt,2}, \ldots, u_{btt,i}, \ldots, u_{btt,n_m}]^T$ to obtain $S(t)=[\varepsilon_{1,x}, \varepsilon_{1,y}, \varepsilon_{1,z}, \gamma_{1,xy}, \gamma_{1,yz}, \gamma_{1,xz}, \ldots, \varepsilon_{i,x}, \varepsilon_{i,y}, \varepsilon_{i,z}, \gamma_{i,xy}, \gamma_{i,yz}, \gamma_{i,xz}, \ldots, \varepsilon_{n_m,x}, \varepsilon_{n_m,y}, \varepsilon_{n_m,z}, \gamma_{n_m,xy}, \gamma_{n_m,yz}, \gamma_{n_m,xz}]^T$, wherein the strains $S(t)$ include the positive strains and the shearing strains.

Although implementation solutions of the present invention are described above in combination with the accompanying drawings, the present invention is not limited to the above-mentioned specific implementation solutions and application fields, and the above-mentioned specific implementation solutions are only schematic and instructive instead of restrictive. Many forms can also be made by the ordinary skilled in the art under enlightenment of the specification and without departing from the protective scope of the claims of the present invention, and all the forms fall within the protective scope of the present invention.

The invention claimed is:

1. A dynamic strain field measuring method for a rotor blade based on blade tip timing to obtain sensing blade tip vibration information by virtue of blade tip timing sensors mounted close to an inner side of a casing, comprising the following steps:

in the first step (S1), determining a to-be-measured rotor blade for the dynamic strain field measuring; establishing a three-dimensional finite element model of the to-be-measured rotor blade, and extracting modal parameters of the three-dimensional finite element model, wherein the three-dimensional finite element model is made of a metal with a density, a Poisson ratio and an elasticity modulus; the rotor blade has a length, a thickness and a width; the three-dimensional finite element model has a plurality of nodes in total; and two side surfaces of a root of the rotor blade are fixedly restricted to simulate a working state of the rotor blade; and wherein strains comprises six strain components, including the three positive strains $\varepsilon_x$, $\varepsilon_y$, $\varepsilon_z$ and three shearing strains $\gamma_{xy}$, $\gamma_{yz}$, $\gamma_{xz}$; and wherein in the first step (S1), first $n_m$ order modal parameters: a modal frequency $f_i$, a displacement modal shape $\phi_i$ with the size being $n_{dof} \times 1$ and a strain modal shape $\psi_i$ with the size being $2n_{dof} \times 1$, of the three-dimensional finite element model are extracted by modal analysis, and a full-field strain modal shape matrix, $\psi=[\psi_1, \psi_2, \ldots, \psi_{n_m}]$ with the size being $2n_{dof} \times n_m$, of the rotor blade is constructed, wherein $n_m$ represents for a modal number, i represents for a modal order, $n_{dof}$ represents for the number of degrees of freedom of the finite element model of the rotor blade, $n_{dof}=3 n_n$, and $n_n$ represents for the number of nodes of the finite element model of the rotor blade; in the second step (S2), determining the number and circumferential mounting positions of the blade tip timing sensors, wherein the blade tip timing sensors are mounted in a circumferential direction of the casing;

in the second step (S2), a relationship between the number $n_{btt}$ of the blade tip timing sensors mounted in a circumferential direction of a rotor blade of the casing and the multimodal number $n_m$ of vibration is that: $n_{btt} \geq 2n_m+1$; and a measuring point selection matrix $S_{btt}$ arranged in a circumferential direction of each of the blade tip timing sensors in the casing under multimodal excitation is constructed:

$$S_{btt} = \begin{bmatrix} 1 & \sin(EO_1\theta_1) & \cos(EO_1\theta_1) & \ldots & \sin(EO_{n_m}\theta_1) & \cos(EO_{n_m}\theta_1) \\ 1 & \sin(EO_1\theta_2) & \cos(EO_1\theta_2) & \ldots & \sin(EO_{n_m}\theta_2) & \cos(EO_{n_m}\theta_2) \\ \vdots & \vdots & \vdots & \vdots & \vdots & \vdots \\ 1 & \sin(EO_1\theta_{n_{btt}}) & \cos(EO_1\theta_{n_{btt}}) & \ldots & \sin(EO_{n_m}\theta_{n_{btt}}) & \cos(EO_{n_m}\theta_{n_{btt}}) \end{bmatrix}$$

wherein the size of the measuring point selection matrix $S_{btt}$ is $n_{btt} \times (2n+1)$, $\theta_j$ represents for layout angles of the blade tip timing sensors (j=1, ... $n_{btt}$) in the casing, $n_{btt}$ represents for the total number of the (j=1, ... $n_{btt}$) to blade tip timing sensors arranged in the circumferential direction, and $EO_i$ represents for a concerned excitation order (i=1, ... $n_m$); a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;

in the third step (S3), establishing a mapping relationship between single-point displacement and full-field dynamic strains of the blade;

in the fourth step (S4), acquiring blade tip single-point displacement of the rotor blade based on the blade tip timing sensors, wherein the blade tip single-point displacement of the rotor blade is acquired based on the blade tip timing sensors; and in the fifth step (S5), realizing, by the single-point displacement, dynamic strain measurement in any position and direction of the rotor blade based on the mapping relationship; thereby realizing a reconstruction of full-field dynamic strains of the rotor blade by only utilizing finite measuring points of a tip of the rotator blade, and reconstructing the full-field dynamic strains of the blade, wherein the blade tip timing sensors are mounted according to the number and circumferential mounting positions determined in the second step (S2).

2. The method according to claim 1, wherein preferably, in the first step (S1), first $n_m$ order modal parameters: a modal frequency $f_i$, a displacement modal shape $\phi_i$ with the size being $n_{dof} \times 1$ and a strain modal shape $\psi_i$ with the size being $2n_{dof} \times 1$, of the three-dimensional finite element model are extracted by modal analysis, and a full-field strain modal shape matrix, $\psi=[\psi_1, \psi_2, \ldots, \psi_{n_m}]$ with the size being $2n_{dof} \times n_m$, of the rotor blade is constructed, wherein $n_{dof}$ represents for a modal number, i represents for a modal order, $n_{dof}$ represents for the number of degrees of freedom of the finite element model of the rotor blade, $n_{dof}=3n_n$, and $n_n$ represents for the number of nodes of the finite element model of the rotor blade.

3. The method according to claim 2, wherein in the first step (S1), strains of each node of the finite element model of the rotor blade comprise six strain components in total, comprising three positive strains $\varepsilon_x$, $\varepsilon_y$, $\varepsilon_z$ and three shearing strains $\gamma_{xy}$, $\gamma_{yz}$, $\gamma_{xz}$.

4. A measuring system for implementing the method according to claim 3, comprising:

a plurality of the blade tip timing sensors configured to be arranged on a rotor blade casing;

a blade tip timing vibration measuring module connected with the blade tip timing sensors so as to measure circumferential blade tip multimodal vibration signals of a rotor blade; and a calculation unit connected with the blade tip timing vibration measuring module, and the calculation unit comprising:

a modal analysis module configured to perform modal analysis based on a three-dimensional finite element model of a to-be-measured rotor blade so as to acquire a displacement modal shape $\phi_i$ of first $n_m$ order modal frequency $f_i$ of the rotor blade and construct a full-field strain modal matrix $\psi=[\psi_1, \psi_2, \ldots, \psi_{n_m}]$ of the rotor blade;

a measuring point optimization module configured to optimize the number of measuring points of the blade tip timing sensors arranged on the rotor blade, wherein a measuring point selection matrix $S_{btt}$ arranged in the circumferential direction of the blade tip timing sensor casing under multimodal excitation is constructed, a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;

a conversion matrix calculation module configured to construct a conversion matrix of single-point displacement and full-field dynamic strains of the blade; and
a strain field reconstruction module configured to calculate positive strains and shearing strains of all nodes on the surface of and inside the blade at each turn of the rotor blade.

5. The method according to claim 2, wherein in the third step (S3), a conversion matrix, $$T = \left[ \frac{\psi_1}{\phi_{btt,1}}, \frac{\psi_2}{\phi_{btt,2}}, \ldots, \frac{\psi_i}{\phi_{btt,i}}, \ldots, \frac{\psi_{n_m}}{\phi_{btt,n_m}} \right]$$

with the size being $2n_{dof} \times n_d$, of the single-point displacement and the full-field dynamic strains of the blade is constructed, wherein $\phi_{btt,i}$ represents for an $i^{th}$ order displacement modal shape of a blade tip timing measuring point of the blade.

6. The method according to claim 5, wherein an $n_m$ order vibration parameter $\beta = (S_{btt})^\dagger u_{btt}(t)$ is acquired by utilizing a circumferential Fourier fitting algorithm, wherein $\beta = [c, A_1 \cos(\varphi_1), A_1 \sin(\varphi_1), \ldots, A_{n_m} \cos(\varphi_{n_m}), A_{n_m} \sin(\varphi_{n_m}) ]^T$, $A_i$ represents for a vibration amplitude, $f_i$ represents for a modal frequency, and $\varphi_i$ represents for an initial phase; the superscript $\dagger$ represents for the inversion of the matrix; the superscript T represents for the transposition of a vector; and further, blade tip single-point multimodal vibration signals are acquired by reconstruction:

$$u_{btt}(t) = c + \sum_{i=1}^{n} u_{btt,i}(t) =$$
$$c + \sum_{i=1}^{n} A_i \sin(\omega_i t + \varphi_i) = c + \sum_{i=1}^{n} A_i \cos(\varphi_i) \sin(\omega_i t) + A_i \sin(\varphi_i) \cos(\omega_i t)$$

wherein $u_{btt,i}(t)$ represents for decoupled $i^{th}$ order vibration signals, c represents for static deformation of the blade, $\omega_i$ represents for a circular frequency of multimodal vibration of the blade, and t represents for a vibration moment of the blade.

7. The method according to claim 6, wherein in the fifth step (S5), based on the conversion matrix T and the decoupled multimodal vibration signals $u_{btt,i}(t)$, strains of all the nodes on a surface of and inside the blade at each turn of the rotor blade or at the moment t are calculated according to a formula $S(t) = T[u_{btt,1}, u_{btt,2}, \ldots, u_{btt,i}, \ldots, u_{btt,n_m}]^T$ to obtain $S(t) = [\varepsilon_{1,x}, \varepsilon_{1,y}, \varepsilon_{1,z}, \gamma_{1,xy}, \gamma_{1,yz}, \gamma_{1,xz}, \ldots, \varepsilon_{i,x}, \varepsilon_{i,y}, \varepsilon_{i,z}, \gamma_{i,xy}, \gamma_{i,yz}, \gamma_{i,xz}, \ldots, \varepsilon_{n_m,x}, \varepsilon_{n_m,y}, \varepsilon_{n_m,z}, \gamma_{n_m,xy}, \gamma_{n_m,yz}, \gamma_{n_m,xz}]^T$, and the strains S(t) comprise positive strains and shearing strains, wherein $\varepsilon_{i,x}$ represents for a positive strain of the $i^{th}$ node of the finite element model of the blade in an x direction, $\varepsilon_{i,y}$ represents for a positive strain of the $i^{th}$ node of the finite element model of the blade in a Y direction, $\varepsilon_{i,z}$ represents for a positive strain of the $i^{th}$ node of the finite element model of the blade in a z direction, $\gamma_{i,xy}$ represents for a shearing strain of the $i^{th}$ node of the finite element model of the blade in an x-y direction, $\gamma_{i,yz}$ represents for a shearing strain of the $i^{th}$ node of the finite element model of the blade in a y-Z direction, $\gamma_{i,xz}$ represents for a shearing strain of the $i^{th}$ node of the finite element model of the blade in an x-z direction, and the superscript T represents for the transposition of a vector.

8. A measuring system for implementing the method according to claim 7, comprising:
the blade tip timing sensors configured to be arranged on a rotor blade casing;
a blade tip timing vibration measuring module connected with the blade tip timing sensors so as to measure circumferential blade tip multimodal vibration signals of a rotor blade; and
a calculation unit connected with the blade tip timing vibration measuring module, and the calculation unit comprising:
a modal analysis module configured to perform modal analysis based on a three-dimensional finite element model of a to-be-measured rotor blade so as to acquire a displacement modal shape $\phi_i$ of first $n_m$ order modal frequency $f_i$ of the rotor blade and construct a full-field strain modal matrix $\psi = [\psi_1, \psi_2, \ldots, \psi_{n_m}]$ of the rotor blade;
a measuring point optimization module configured to optimize the number of measuring points of the blade tip timing sensors arranged on the rotor blade, wherein a measuring point selection matrix $S_{btt}$ arranged in the circumferential direction of the blade tip timing sensor casing under multimodal excitation is constructed, a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;
a conversion matrix calculation module configured to construct a conversion matrix of single-point displacement and full-field dynamic strains of the blade; and
a strain field reconstruction module configured to calculate positive strains and shearing strains of all nodes on the surface of and inside the blade at each turn of the rotor blade.

9. A measuring system for implementing the method according to claim 6, comprising:
the blade tip timing sensors configured to be arranged on a rotor blade casing;
a blade tip timing vibration measuring module connected with the blade tip timing sensors so as to measure circumferential blade tip multimodal vibration signals of a rotor blade; and
a calculation unit connected with the blade tip timing vibration measuring module, and the calculation unit comprising:
a modal analysis module configured to perform modal analysis based on a three-dimensional finite element model of a to-be-measured rotor blade so as to acquire a displacement modal shape $\phi_i$ of first $n_m$ order modal frequency $f_i$ of the rotor blade and construct a full-field strain modal matrix $\psi = [\psi_1, \psi_2, \ldots, \psi_{n_m}]$ of the rotor blade;
a measuring point optimization module configured to optimize the number of measuring points of the blade tip timing sensors arranged on the rotor blade, wherein a measuring point selection matrix $S_{btt}$ arranged in the circumferential direction of the blade tip timing sensor casing under multimodal excitation is constructed, a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;

a conversion matrix calculation module configured to construct a conversion matrix of single-point displacement and full-field dynamic strains of the blade; and a strain field reconstruction module configured to calculate positive strains and shearing strains of all nodes on the surface of and inside the blade at each turn of the rotor blade.

10. A measuring system for implementing the method according to claim 2, comprising:

the blade tip timing sensors configured to be arranged on a rotor blade casing;

a blade tip timing vibration measuring module connected with the blade tip timing sensors so as to measure circumferential blade tip multimodal vibration signals of a rotor blade; and a calculation unit connected with the blade tip timing vibration measuring module, and the calculation unit comprising:

a modal analysis module configured to perform modal analysis based on a three-dimensional finite element model of a to-be-measured rotor blade so as to acquire a displacement modal shape $\phi_i$ of first $n_m$ order modal frequency $f_i$ of the rotor blade and construct a full-field strain modal matrix $\psi=[\psi_1,\psi_2, \ldots ,\psi_{n_m}]$ of the rotor blade;

a measuring point optimization module configured to optimize the number of measuring points of the blade tip timing sensors arranged on the rotor blade, wherein a measuring point selection matrix $S_{btt}$ arranged in the circumferential direction of the blade tip timing sensor casing under multimodal excitation is constructed, a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;

a conversion matrix calculation module configured to construct a conversion matrix of single-point displacement and full-field dynamic strains of the blade; and a strain field reconstruction module configured to calculate positive strains and shearing strains of all nodes on the surface of and inside the blade at each turn of the rotor blade.

11. A measuring system for implementing the method according to claim 4, comprising:

the blade tip timing sensors configured to be arranged on a rotor blade casing;

a blade tip timing vibration measuring module connected with the blade tip timing sensors so as to measure circumferential blade tip multimodal vibration signals of a rotor blade; and a calculation unit connected with the blade tip timing vibration measuring module, and the calculation unit comprising:

a modal analysis module configured to perform modal analysis based on a three-dimensional finite element model of a to-be-measured rotor blade so as to acquire a displacement modal shape $\phi_i$ of first $n_m$ order modal frequency $f_i$ of the rotor blade and construct a full-field strain modal matrix $\psi=[\psi_1,\psi_2, \ldots ,\psi_{n_m}]$ of the rotor blade;

a measuring point optimization module configured to optimize the number of measuring points of the blade tip timing sensors arranged on the rotor blade, wherein a measuring point selection matrix $S_{btt}$ arranged in the circumferential direction of the blade tip timing sensor casing under multimodal excitation is constructed, a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;

a conversion matrix calculation module configured to construct a conversion matrix of single-point displacement and full-field dynamic strains of the blade; and a strain field reconstruction module configured to calculate positive strains and shearing strains of all nodes on the surface of and inside the blade at each turn of the rotor blade.

12. A measuring system for implementing the method according to claim 1, comprising:

the blade tip timing sensors configured to be arranged on a rotor blade casing;

a blade tip timing vibration measuring module connected with the blade tip timing sensors so as to measure circumferential blade tip multimodal vibration signals of a rotor blade; and a calculation unit connected with the blade tip timing vibration measuring module, and the calculation unit comprising:

a modal analysis module configured to perform modal analysis based on a three-dimensional finite element model of a to-be-measured rotor blade so as to acquire a displacement modal shape $\phi_i$ of first $n_m$ order modal frequency $f_i$ of the rotor blade and construct a full-field strain modal matrix $\psi=[\psi_1,\psi_2, \ldots ,\psi_{n_m}]$ of the rotor blade;

a measuring point optimization module configured to optimize the number of measuring points of the blade tip timing sensors arranged on the rotor blade, wherein a measuring point selection matrix $S_{btt}$ arranged in the circumferential direction of the blade tip timing sensor casing under multimodal excitation is constructed, a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;

a conversion matrix calculation module configured to construct a conversion matrix of single-point displacement and full-field dynamic strains of the blade; and a strain field reconstruction module configured to calculate positive strains and shearing strains of all nodes on the surface of and inside the blade at each turn of the rotor blade.

13. The measuring system according to claim 12, wherein the blade tip timing vibration measuring module comprises the rotating speed sensor, a signal conditioning module and a time-displacement conversion module, wherein the rotating speed sensor is configured to measure the rotating speed of the blade; the time-displacement conversion module is configured to acquire blade tip vibration displacement of the blade based on a speed signal; and the signal conditioning module is configured to extract a vibration frequency and amplitude value parameters of the blade from vibration displacement.

14. A measuring system for implementing the method according to claim 1, comprising:
   the blade tip timing sensors configured to be arranged on a rotor blade casing;
   a blade tip timing vibration measuring module connected with the blade tip timing sensors so as to measure circumferential blade tip multimodal vibration signals of a rotor blade; and
   a calculation unit connected with the blade tip timing vibration measuring module, and the calculation unit comprising:
   a modal analysis module configured to perform modal analysis based on a three-dimensional finite element model of a to-be-measured rotor blade so as to acquire a displacement modal shape $\phi_i$ of first $n_m$ order modal frequency $f_i$ of the rotor blade and construct a full-field strain modal matrix $\psi=[\psi_1,\psi_2, \ldots ,\psi_{n_m}]$ of the rotor blade;
   a measuring point optimization module configured to optimize the number of measuring points of the blade tip timing sensors arranged on the rotor blade, wherein a measuring point selection matrix $S_{btt}$ arranged in the circumferential direction of the blade tip timing sensor casing under multimodal excitation is constructed, a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;
   a conversion matrix calculation module configured to construct a conversion matrix of single-point displacement and full-field dynamic strains of the blade; and
   a strain field reconstruction module configured to calculate positive strains and shearing strains of all nodes on the surface of and inside the blade at each turn of the rotor blade.

15. A measuring system for implementing the method according to claim 1, comprising:
   the blade tip timing sensors configured to be arranged on a rotor blade casing;
   a blade tip timing vibration measuring module connected with the blade tip timing sensors so as to measure circumferential blade tip multimodal vibration signals of a rotor blade; and
   a calculation unit connected with the blade tip timing vibration measuring module, and the calculation unit comprising:
   a modal analysis module configured to perform modal analysis based on a three-dimensional finite element model of a to-be-measured rotor blade so as to acquire a displacement modal shape $\phi_i$ of first $n_m$ order modal frequency $f_i$ of the rotor blade and construct a full-field strain modal matrix $\psi=[\psi_1,\psi_2, \ldots ,\psi_{n_m}]$ of the rotor blade;
   a measuring point optimization module configured to optimize the number of measuring points of the blade tip timing sensors arranged on the rotor blade, wherein a measuring point selection matrix $S_{btt}$ arranged in the circumferential direction of the blade tip timing sensor casing under multimodal excitation is constructed, a position where a rotating speed sensor is located serves as a reference 0°, a limited mounting angle range of the casing is removed, and $n_{btt}$ angles are randomly selected in the circumferential direction of the casing to serve as mounting positions of the blade tip timing sensors; and the condition number κ of the blade tip timing measuring point selection matrix $S_{btt}$ is calculated, a random process is repeated for R times, and a measuring point layout when the condition number κ of the matrix is minimum is selected therefrom;
   a conversion matrix calculation module configured to construct a conversion matrix of single-point displacement and full-field dynamic strains of the blade; and
   a strain field reconstruction module configured to calculate positive strains and shearing strains of all nodes on the surface of and inside the blade at each turn of the rotor blade.

* * * * *